US008767331B2

(12) United States Patent
Wagner et al.

(10) Patent No.: US 8,767,331 B2
(45) Date of Patent: Jul. 1, 2014

(54) ERASE DRIVE SYSTEM AND METHODS OF ERASURE FOR TAPE DATA CARTRIDGE

(75) Inventors: Gregory Lawrence Wagner, Arden Hills, MN (US); Matthew P. Dugas, St. Paul, MN (US)

(73) Assignee: Advanced Research Corporation, White Bear Lake, MN (US)

( * ) Notice: Subject to any disclaimer, the term of this patent is extended or adjusted under 35 U.S.C. 154(b) by 898 days.

(21) Appl. No.: 12/847,966

(22) Filed: Jul. 30, 2010

(65) Prior Publication Data

US 2011/0043940 A1 Feb. 24, 2011

Related U.S. Application Data

(60) Provisional application No. 61/230,576, filed on Jul. 31, 2009, provisional application No. 61/357,836, filed on Jun. 23, 2010.

(51) Int. Cl.
*G11B 5/02* (2006.01)

(52) U.S. Cl.
USPC .......................................................... 360/57

(58) Field of Classification Search
CPC ...................................................... G11B 5/02
USPC ...................... 360/66, 55, 77.12, 48, 121, 57
See application file for complete search history.

(56) References Cited

U.S. PATENT DOCUMENTS

| 2,938,962 | A | 5/1960 | Konins et al. |
| 3,192,608 | A | 7/1965 | Rinia et al. |
| 3,417,386 | A | 12/1968 | Schneider |
| 3,699,334 | A | 10/1972 | Cohen et al. |
| 3,750,828 | A | 8/1973 | Constable |
| 3,853,715 | A | 12/1974 | Romankiw |
| 4,007,493 | A | 2/1977 | Behr et al. |
| 4,088,490 | A | 5/1978 | Duke et al. |
| 4,268,881 | A | 5/1981 | Saito |
| 4,298,899 | A | 11/1981 | Argumedo et al. |
| 4,314,290 | A | 2/1982 | Ragle |
| 4,318,146 | A | 3/1982 | Ike et al. |
| 4,408,240 | A | 10/1983 | Pastore |
| 4,457,803 | A | 7/1984 | Takigawa |

(Continued)

FOREIGN PATENT DOCUMENTS

| DE | 2912309 | 10/1979 |
| EP | 0407244 | 1/1991 |

(Continued)

OTHER PUBLICATIONS

Hisatoshi, Hata, Patent Abstracts of Japan (Publication No. 06333210), Feb. 12, 1994.

(Continued)

*Primary Examiner* — Fred Tzeng
(74) *Attorney, Agent, or Firm* — Winthrop & Weinstine, P.A.

(57) ABSTRACT

The present disclosure relates generally to writing and reading data from a magnetic tape storage media and, more particularly, to a secure erasure system for the eradication of the data contained in the data tracks of a tape media such that substantially all of the data can be erased while leaving the servo bands substantially unaltered or within specification. A data tape cartridge erased with such a system can then be reused in a secure data storage environment with complete confidence that any data from a previous usage is not subject to discovery.

30 Claims, 16 Drawing Sheets

(56) References Cited

U.S. PATENT DOCUMENTS

| | | |
|---|---|---|
| 4,488,188 A | 12/1984 | Hansen et al. |
| 4,490,756 A | 12/1984 | Dost et al. |
| 4,535,376 A | 8/1985 | Nomura et al. |
| 4,539,615 A | 9/1985 | Arai et al. |
| 4,586,094 A | 4/1986 | Chambors et al. |
| 4,598,327 A | 7/1986 | Jen et al. |
| 4,609,959 A | 9/1986 | Rudi |
| 4,631,479 A | 12/1986 | Haga |
| 4,642,709 A | 2/1987 | Vinal |
| 4,673,999 A | 6/1987 | Suyama et al. |
| 4,685,012 A | 8/1987 | DeWit et al. |
| 4,752,850 A | 6/1988 | Yamada et al. |
| 4,758,304 A | 7/1988 | McNeil et al. |
| 4,758,907 A | 7/1988 | Okamoto et al. |
| 4,837,924 A | 6/1989 | Lazzari |
| 4,897,748 A | 1/1990 | Takahashi et al. |
| 4,901,178 A | 2/1990 | Kobayashi et al. |
| 4,906,552 A | 3/1990 | Ngo et al. |
| 4,914,805 A | 4/1990 | Kawase |
| 4,927,804 A | 5/1990 | Zieren et al. |
| 4,945,438 A | 7/1990 | Matsumoto et al. |
| 4,971,947 A | 11/1990 | Barnes et al. |
| 4,992,897 A | 2/1991 | Deroux-Dauphin |
| 5,016,342 A | 5/1991 | Pisharody et al. |
| 5,017,326 A | 5/1991 | Wash et al. |
| 5,027,244 A | 6/1991 | Hayakawa |
| 5,035,787 A | 7/1991 | Parker et al. |
| 5,055,951 A | 10/1991 | Behr |
| 5,067,230 A | 11/1991 | Meunier et al. |
| 5,079,663 A | 1/1992 | Ju et al. |
| 5,086,015 A | 2/1992 | Itoh et al. |
| 5,090,111 A | 2/1992 | Lazzari |
| 5,093,980 A | 3/1992 | Maurice et al. |
| 5,115,362 A * | 5/1992 | Harada et al. ............... 360/92.1 |
| 5,124,869 A | 6/1992 | Lehureau |
| 5,126,231 A | 6/1992 | Levy |
| 5,132,861 A | 7/1992 | Behr et al. |
| 5,160,078 A | 11/1992 | Spicer |
| 5,189,580 A | 2/1993 | Pisharody et al. |
| 5,195,006 A | 3/1993 | Morikawa |
| 5,196,969 A | 3/1993 | Iwamatsu et al. |
| 5,211,734 A | 5/1993 | Yagami et al. |
| 5,224,260 A | 7/1993 | Fedeli et al. |
| 5,229,895 A | 7/1993 | Schwarz et al. |
| 5,241,442 A | 8/1993 | Akashi |
| 5,262,908 A | 11/1993 | Iwamatsu et al. |
| 5,280,402 A | 1/1994 | Anderson et al. |
| 5,293,281 A | 3/1994 | Behr et al. |
| 5,301,418 A | 4/1994 | Dime et al. |
| 5,307,217 A | 4/1994 | Saliba |
| 5,309,299 A | 5/1994 | Crossland et al. |
| 5,319,502 A | 6/1994 | Feig |
| 5,321,570 A | 6/1994 | Behr et al. |
| 5,371,638 A | 12/1994 | Saliba |
| 5,379,170 A | 1/1995 | Schwarz |
| 5,394,278 A | 2/1995 | Pahr et al. |
| 5,394,285 A | 2/1995 | Dee et al. |
| 5,398,145 A | 3/1995 | Jeffers et al. |
| 5,402,295 A | 3/1995 | Suzuki et al. |
| 5,405,734 A | 4/1995 | Aita |
| 5,423,116 A | 6/1995 | Sundaram |
| 5,426,543 A | 6/1995 | Dy et al. |
| 5,432,652 A | 7/1995 | Comeaux et al. |
| 5,434,732 A | 7/1995 | Schwarz et al. |
| 5,447,598 A | 9/1995 | Mihara et al. |
| 5,450,257 A | 9/1995 | Tran et al. |
| 5,452,152 A | 9/1995 | Rudi |
| 5,452,165 A | 9/1995 | Chen et al. |
| 5,452,166 A | 9/1995 | Aylwin et al. |
| 5,488,525 A | 1/1996 | Adams et al. |
| 5,504,339 A | 4/1996 | Masuda |
| 5,506,737 A | 4/1996 | Lin et al. |
| 5,523,185 A | 6/1996 | Goto |
| 5,523,904 A | 6/1996 | Saliba |
| 5,552,944 A | 9/1996 | Clemow |
| 5,567,333 A | 10/1996 | Hira et al. |
| 5,572,392 A | 11/1996 | Aboaf et al. |
| 5,587,307 A | 12/1996 | Albom, Jr. et al. |
| 5,593,065 A | 1/1997 | Harrold |
| 5,602,703 A | 2/1997 | Moore et al. |
| 5,606,478 A | 2/1997 | Chen et al. |
| 5,616,921 A | 4/1997 | Talbot et al. |
| 5,621,188 A | 4/1997 | Lee et al. |
| 5,629,813 A | 5/1997 | Baca et al. |
| 5,639,509 A | 6/1997 | Schemmel |
| 5,652,015 A | 7/1997 | Aboaf et al. |
| 5,655,286 A | 8/1997 | Jones, Jr. |
| 5,665,251 A | 9/1997 | Robertson et al. |
| 5,666,249 A | 9/1997 | Ohmori et al. |
| 5,675,461 A | 10/1997 | Aylwin et al. |
| 5,677,011 A | 10/1997 | Hatakeyama et al. |
| 5,680,278 A | 10/1997 | Sawtelle, Jr. |
| 5,689,384 A | 11/1997 | Albrecht et al. |
| 5,710,673 A | 1/1998 | Varian |
| 5,715,597 A | 2/1998 | Aylwin et al. |
| 5,719,730 A | 2/1998 | Chang et al. |
| 5,723,234 A | 3/1998 | Yokoyama et al. |
| 5,726,841 A | 3/1998 | Tong et al. |
| 5,737,826 A | 4/1998 | Slade et al. |
| 5,742,452 A | 4/1998 | Simmons et al. |
| 5,751,526 A | 5/1998 | Schemmel |
| 5,752,309 A | 5/1998 | Partee et al. |
| 5,757,575 A | 5/1998 | Hallamasek et al. |
| 5,768,070 A | 6/1998 | Krounbi et al. |
| 5,771,142 A | 6/1998 | Maurice et al. |
| 5,793,577 A | 8/1998 | Katz et al. |
| 5,822,159 A | 10/1998 | Fukuyama et al. |
| 5,831,792 A | 11/1998 | Ananth |
| 5,863,450 A | 1/1999 | Dutertre et al. |
| 5,867,339 A | 2/1999 | Panish et al. |
| 5,890,278 A | 4/1999 | Van Kesteren |
| 5,909,346 A | 6/1999 | Malhotra et al. |
| 5,920,447 A | 7/1999 | Sakata et al. |
| 5,923,272 A | 7/1999 | Albrecht et al. |
| 5,930,065 A | 7/1999 | Albrecht et al. |
| 5,940,238 A | 8/1999 | Nayak et al. |
| 5,966,264 A | 10/1999 | Belser et al. |
| 5,966,323 A | 10/1999 | Chen et al. |
| 5,973,874 A | 10/1999 | Panish et al. |
| 5,982,711 A | 11/1999 | Knowles et al. |
| 5,995,315 A | 11/1999 | Fasen |
| 6,005,737 A | 12/1999 | Connolly et al. |
| 6,018,444 A | 1/2000 | Beck et al. |
| 6,021,013 A | 2/2000 | Albrecht et al. |
| 6,025,970 A | 2/2000 | Cheung |
| 6,031,673 A | 2/2000 | Fasen et al. |
| 6,034,835 A | 3/2000 | Serrano |
| 6,075,678 A | 6/2000 | Saliba |
| 6,081,401 A | 6/2000 | Varian |
| 6,088,184 A | 7/2000 | Hu |
| 6,090,507 A | 7/2000 | Grenon et al. |
| 6,111,719 A | 8/2000 | Fasen |
| 6,118,630 A | 9/2000 | Argumedo |
| 6,130,804 A | 10/2000 | Panish et al. |
| 6,141,174 A | 10/2000 | Judge et al. |
| 6,156,487 A | 12/2000 | Jennison et al. |
| 6,163,421 A | 12/2000 | Sasaki et al. |
| 6,163,436 A | 12/2000 | Grenon et al. |
| 6,165,649 A | 12/2000 | Grenon et al. |
| 6,169,640 B1 | 1/2001 | Fasen |
| 6,190,836 B1 | 2/2001 | Grenon et al. |
| 6,222,698 B1 | 4/2001 | Barndt et al. |
| 6,229,669 B1 | 5/2001 | Beck et al. |
| 6,236,525 B1 | 5/2001 | Cates et al. |
| 6,236,538 B1 | 5/2001 | Yamada et al. |
| 6,269,533 B2 | 8/2001 | Dugas |
| 6,275,350 B1 | 8/2001 | Barndt |
| 6,282,051 B1 | 8/2001 | Albrecht et al. |
| 6,307,718 B1 | 10/2001 | Kasetty |
| 6,320,719 B1 | 11/2001 | Albrecht et al. |
| 6,385,557 B1 | 5/2002 | Mundo et al. |
| 6,433,949 B1 | 8/2002 | Murphy et al. |
| 6,445,550 B1 | 9/2002 | Ishi |
| 6,462,904 B1 | 10/2002 | Albrecht et al. |

(56) References Cited

U.S. PATENT DOCUMENTS

| | | |
|---|---|---|
| 6,469,867 B2 | 10/2002 | Saliba |
| 6,496,328 B1 | 12/2002 | Dugas |
| 6,542,325 B1 | 4/2003 | Molstad et al. |
| 6,545,837 B1 | 4/2003 | Tran |
| 6,574,066 B1 | 6/2003 | Stubbs et al. |
| 6,590,729 B1 | 7/2003 | Akagi et al. |
| 6,622,490 B2 | 9/2003 | Ingistov |
| 6,635,404 B1 | 10/2003 | Choi et al. |
| 6,650,496 B2 | 11/2003 | Nozieres et al. |
| 6,700,729 B1 | 3/2004 | Beck et al. |
| 6,707,630 B2 | 3/2004 | Doi et al. |
| 6,721,126 B1 | 4/2004 | Bui et al. |
| 6,744,594 B2 | 6/2004 | Denison et al. |
| 6,754,026 B1 | 6/2004 | Koski |
| 6,778,359 B1 | 8/2004 | Iwama |
| 6,781,778 B1 | 8/2004 | Molstad et al. |
| 6,795,246 B2 | 9/2004 | Yano et al. |
| 6,798,608 B2 | 9/2004 | Chliwnyj et al. |
| 6,801,383 B2 | 10/2004 | Zweighaft et al. |
| 6,801,391 B2 | 10/2004 | Sugawara et al. |
| 6,831,805 B2 | 12/2004 | Chliwnyj et al. |
| 6,842,305 B2 | 1/2005 | Molstad et al. |
| 6,865,050 B2 | 3/2005 | Nakao et al. |
| 6,873,487 B2 | 3/2005 | Molstad |
| 6,879,457 B2 | 4/2005 | Eaton et al. |
| 6,894,869 B2 | 5/2005 | Dugas |
| 6,943,987 B1 | 9/2005 | Raymond et al. |
| 6,947,247 B2 | 9/2005 | Schwarz et al. |
| 6,947,256 B2 | 9/2005 | Biskeborn |
| 6,950,277 B1 | 9/2005 | Nguy et al. |
| 6,963,467 B2 | 11/2005 | Bui et al. |
| 6,970,312 B2 | 11/2005 | Yip et al. |
| 6,987,648 B2 | 1/2006 | Dugas |
| 6,989,950 B2 | 1/2006 | Ohtsu |
| 6,989,960 B2 | 1/2006 | Dugas |
| 7,009,810 B2 | 3/2006 | Dugas |
| 7,072,133 B1 | 7/2006 | Yip et al. |
| 7,106,544 B2 | 9/2006 | Dugas et al. |
| 7,119,976 B2 | 10/2006 | Biskeborn et al. |
| 7,130,140 B1 | 10/2006 | Boyer |
| 7,130,152 B1 | 10/2006 | Raymond et al. |
| 7,142,388 B2 | 11/2006 | Tateishi et al. |
| 7,170,702 B2 | 1/2007 | Ohtsu |
| 7,190,551 B2 | 3/2007 | Suda |
| 7,196,870 B2 | 3/2007 | Dugas |
| 7,206,170 B2 | 4/2007 | Yip |
| 7,218,476 B2 | 5/2007 | Dugas |
| 7,224,544 B2 | 5/2007 | Takano et al. |
| 7,256,962 B2 | 8/2007 | Tateishi |
| 7,283,317 B2 | 10/2007 | Dugas et al. |
| 7,301,716 B2 | 11/2007 | Dugas et al. |
| 7,304,576 B2 | 12/2007 | Findlay et al. |
| 7,386,934 B2 | 6/2008 | Dugas et al. |
| 7,426,093 B2 | 9/2008 | Dugas |
| 7,450,341 B2 | 11/2008 | Dugas et al. |
| 7,453,361 B2 | 11/2008 | Findlay et al. |
| 7,492,550 B2 | 2/2009 | Samofalov et al. |
| 7,511,907 B2 | 3/2009 | Dugas et al. |
| 7,511,908 B2 | 3/2009 | Winarski |
| 7,515,374 B2 | 4/2009 | Nakao |
| 7,525,761 B2 | 4/2009 | Dugas |
| 7,639,448 B2 | 12/2009 | Haustein |
| 7,679,858 B2 | 3/2010 | Winarski et al. |
| 7,710,675 B2 | 5/2010 | Dugas et al. |
| 7,773,340 B2 | 8/2010 | Dugas |
| 7,800,862 B1 | 9/2010 | Dugas et al. |
| 7,808,736 B2 * | 10/2010 | Tanaka et al. .................. 360/48 |
| 7,835,108 B2 * | 11/2010 | Johnson et al. ............ 360/77.12 |
| 2001/0003862 A1 | 6/2001 | Dugas |
| 2001/0045005 A1 | 11/2001 | Dugas |
| 2002/0034042 A1 | 3/2002 | Hugerford et al. |
| 2002/0058204 A1 | 5/2002 | Khojasteh et al. |
| 2002/0061465 A1 | 5/2002 | Hasegawa et al. |
| 2002/0125289 A1 | 9/2002 | Huetter |
| 2002/0171974 A1 | 11/2002 | Dugas |
| 2002/0177066 A1 | 11/2002 | Song et al. |
| 2003/0016446 A1 | 1/2003 | Yano |
| 2003/0039063 A1 | 2/2003 | Dugas |
| 2003/0099057 A1 | 5/2003 | Molstad |
| 2003/0099059 A1 | 5/2003 | Nakao |
| 2003/0137768 A1 | 7/2003 | Chliwnyj et al. |
| 2003/0151844 A1 | 8/2003 | Eaton et al. |
| 2004/0001271 A1 | 1/2004 | Chliwnyj et al. |
| 2004/0001275 A1 | 1/2004 | Chliwnyj et al. |
| 2004/0109261 A1 | 6/2004 | Dugas |
| 2004/0145827 A1 | 7/2004 | Biskeborn et al. |
| 2004/0174628 A1 | 9/2004 | Schwarz et al. |
| 2005/0007323 A1 | 1/2005 | Appelbaum et al. |
| 2005/0047008 A1 * | 3/2005 | Tateishi ..................... 360/121 |
| 2005/0052779 A1 | 3/2005 | Nakao et al. |
| 2005/0052783 A1 | 3/2005 | Suda |
| 2005/0099713 A1 | 5/2005 | Molstad et al. |
| 2005/0099715 A1 | 5/2005 | Yip et al. |
| 2005/0152066 A1 | 7/2005 | Yip |
| 2005/0157422 A1 | 7/2005 | Dugas et al. |
| 2005/0168869 A1 | 8/2005 | Dugas et al. |
| 2005/0180040 A1 | 8/2005 | Dugas et al. |
| 2005/0219734 A1 | 10/2005 | Rothermel et al. |
| 2005/0254170 A1 | 11/2005 | Dugas et al. |
| 2005/0259364 A1 | 11/2005 | Yip |
| 2005/0275968 A1 | 12/2005 | Dugas |
| 2006/0061906 A1 | 3/2006 | Dugas |
| 2006/0126207 A1 | 6/2006 | Johnson et al. |
| 2007/0047122 A1 * | 3/2007 | Czarnecki et al. .............. 360/55 |
| 2009/0002859 A1 | 1/2009 | Johnson et al. |
| 2009/0097155 A1 | 4/2009 | Dugas |
| 2009/0262452 A1 | 10/2009 | Dugas |
| 2010/0002335 A1 | 1/2010 | Dugas |
| 2010/0027153 A1 | 2/2010 | Dugas |

FOREIGN PATENT DOCUMENTS

| | | |
|---|---|---|
| EP | 0 557 552 | 9/1993 |
| EP | 0690442 | 1/1996 |
| EP | 0328104 | 8/1998 |
| EP | 0913813 | 5/1999 |
| JP | 53007219 | 1/1978 |
| JP | 58146011 | 8/1983 |
| JP | 59008833 | 1/1984 |
| JP | 60078347 | 4/1985 |
| JP | 61151667 | 6/1986 |
| JP | 61174630 | 8/1986 |
| JP | 61291074 | 12/1986 |
| JP | 01064104 | 3/1989 |
| JP | 02094019 | 4/1990 |
| JP | 02097659 | 4/1990 |
| JP | 02288530 | 10/1990 |
| JP | 03078104 | 4/1991 |
| JP | 03198210 | 8/1991 |
| JP | 03269804 | 12/1991 |
| JP | 03324223 | 12/1991 |
| JP | H04090110 | 3/1992 |
| JP | 04091317 | 4/1992 |
| JP | 4103009 | 4/1992 |
| JP | 06035569 | 3/1994 |
| JP | 06089412 | 3/1994 |
| JP | 07187016 | 7/1994 |
| JP | 06243429 | 9/1994 |
| JP | 06242827 | 10/1994 |
| JP | 06301926 | 10/1994 |
| JP | 06333210 | 12/1994 |
| JP | 10198918 | 7/1995 |
| JP | 09138912 | 5/1997 |
| JP | 09219006 | 8/1997 |
| JP | 09219010 | 8/1997 |
| JP | 10011714 | 1/1998 |
| JP | H10269526 | 10/1998 |
| JP | 11039623 | 2/1999 |
| JP | 11045402 | 2/1999 |
| JP | 11242803 | 9/1999 |
| JP | 10334435 | 12/1999 |
| JP | 11353609 | 12/1999 |
| JP | 2002308945 | 10/2002 |
| JP | A2003168203 | 6/2003 |

(56) References Cited

FOREIGN PATENT DOCUMENTS

| JP | 2005063623 | 3/2005 |
|---|---|---|
| WO | 9740493 | 10/1994 |
| WO | 9705603 | 2/1997 |
| WO | 9950834 | 10/1999 |
| WO | 9967777 | 12/1999 |
| WO | 0051109 | 8/2000 |
| WO | 0150463 | 7/2001 |
| WO | WO 2009/094516 | 7/2009 |

OTHER PUBLICATIONS

Yiqun, Li, et al. "Magnetic Properties and Crystal Structure of FeTaAlN Soft Magnetic materials for MIG Head", (Abstract).

Albrecht, Thomas et al. "Time-Based, Track Following Servos for Linear tape Drives", Data Storage, Oct. 1997.

Monigle, William c. "FIBs Probe and Fix Semiconductor Problems", Test & Measurement World, May 1988.

Fujiii, S. et al. "A Planarization technology using a bias-deposited dielectric film and an etch-backprocess", IEEE Transactions on, vol. 35, Issue 11, Nov. 1988, pp. 1829-1833.

McDermott, Michael, "Head Makers Discovery Focused Ion Beams", Data Storage, Mar. 1998.

R.C. Barrett, et al. "Timing based Track-Following Servo for Linear Tape Systems", IEEE Transactions on Magnetics, vol. 34, No. 4, Jul. 1998, pp. 1872-1877.

IBM TDB "Hybrid Thin R W Head with Bonding by Laser Beam", vol. 19, Issue No. 2, pp. 681-682 (Jul. 1976).

Dee et al., "Advanced Multi-Track Tape Head for High Performance Tape Recording Application", Mar. 1999, IEEE Transactions Magnetics, vol. 35, No. 2, pp. 712-717.

\* cited by examiner

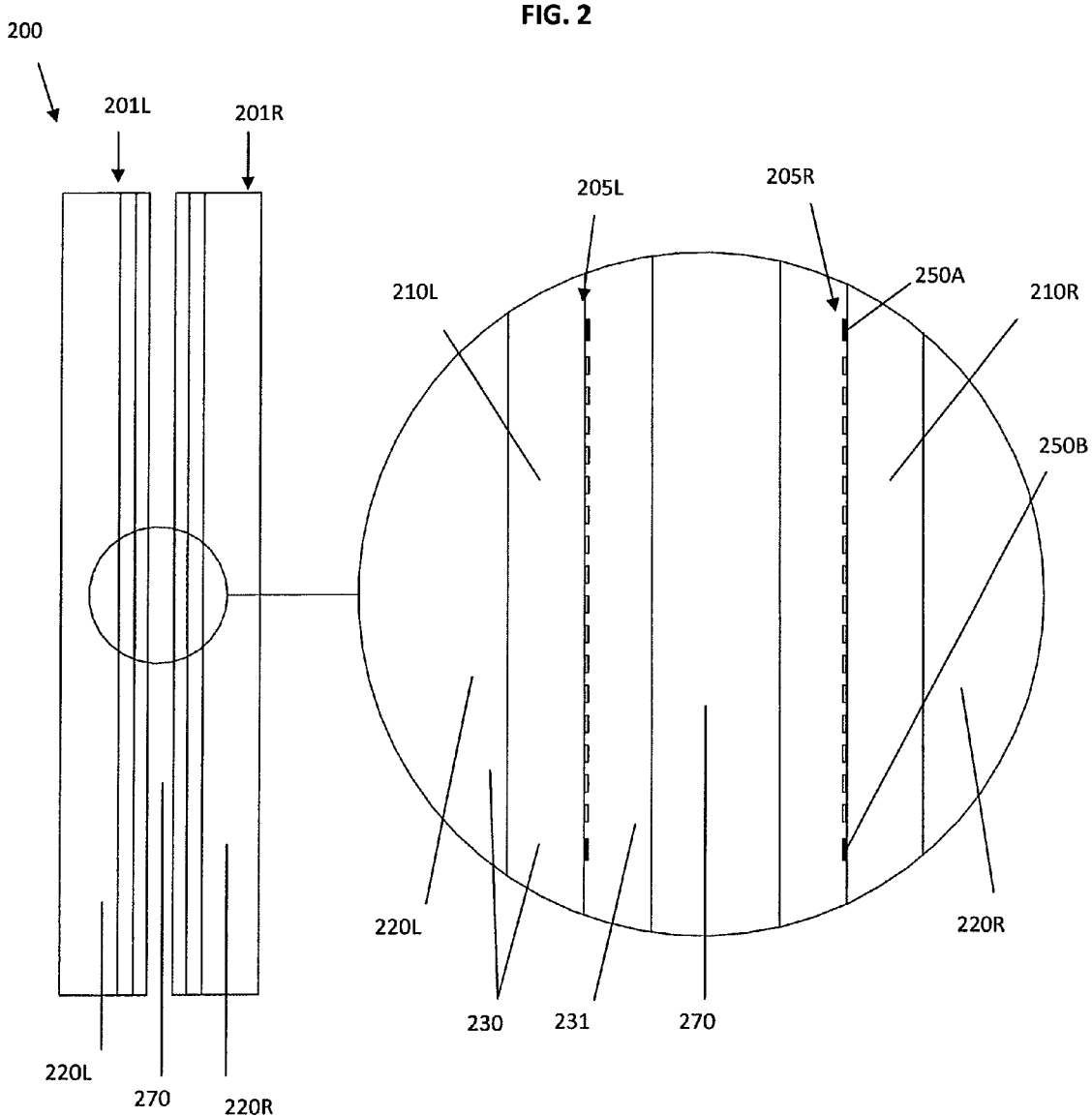

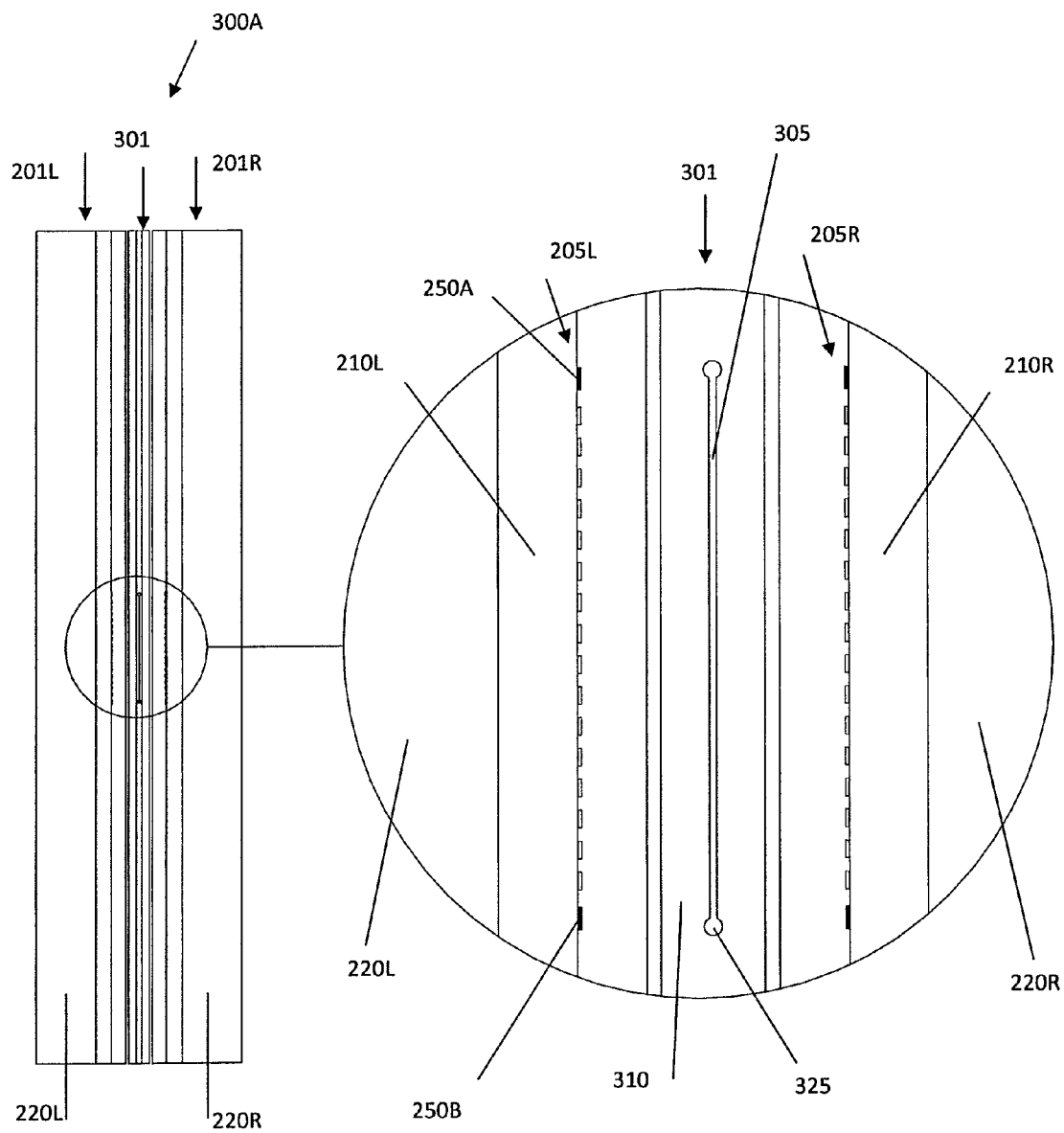

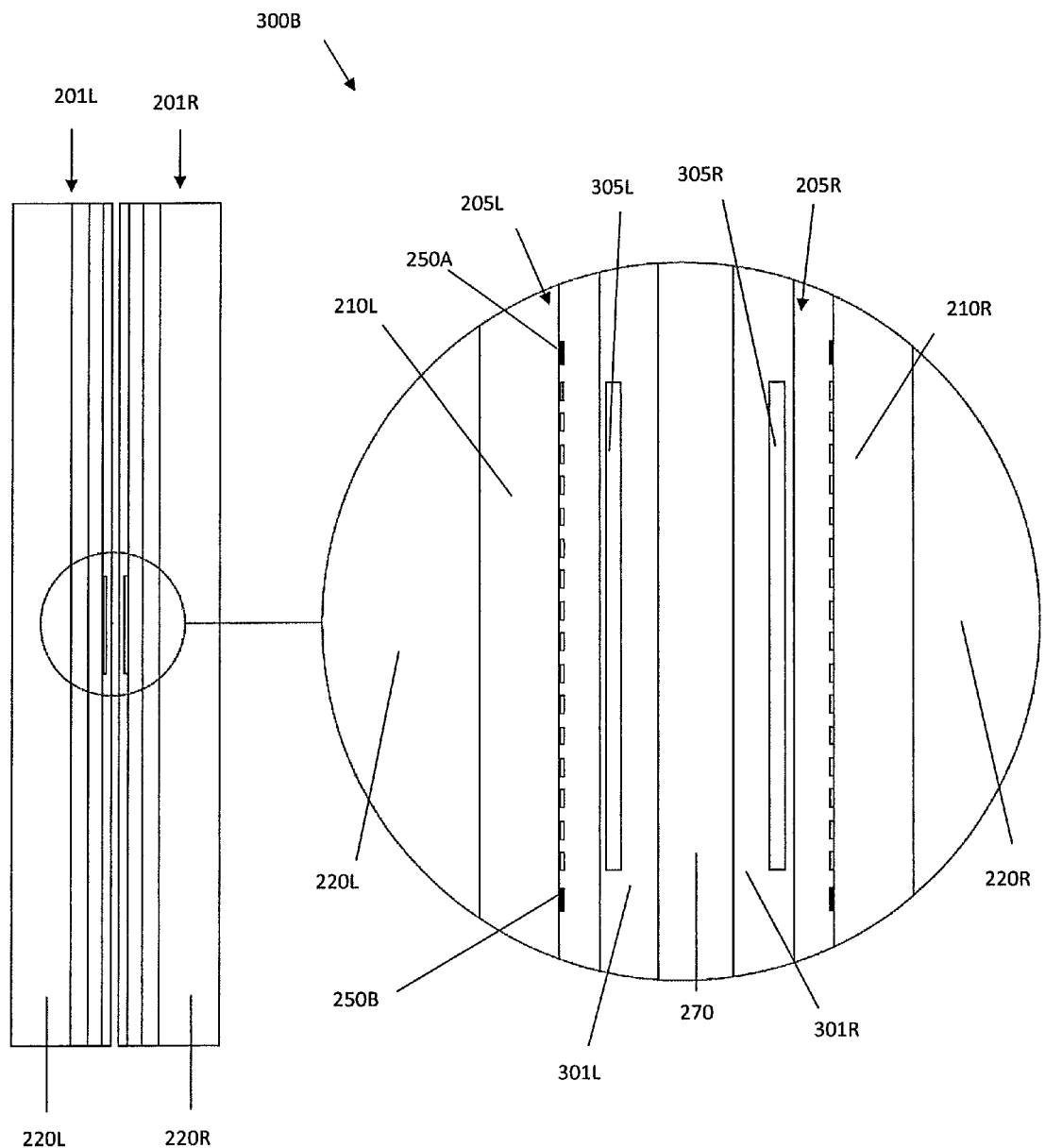

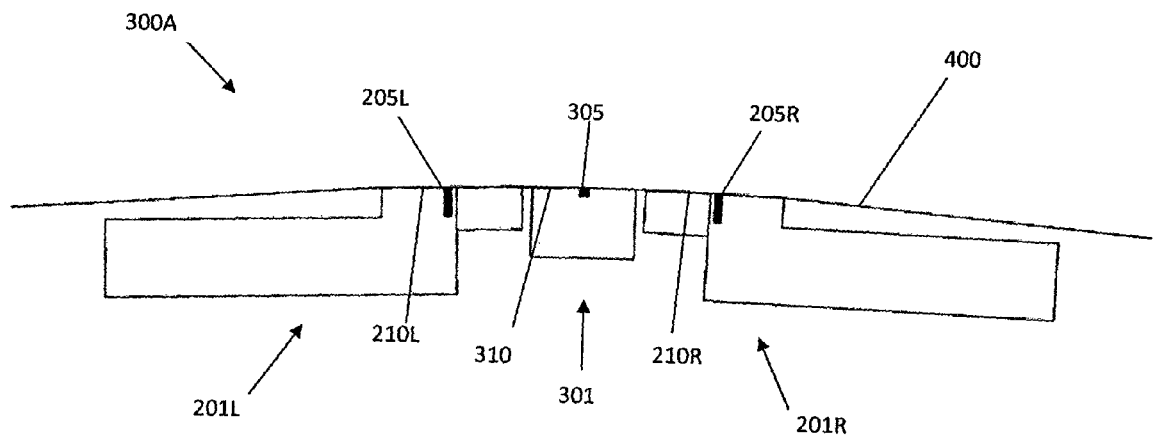
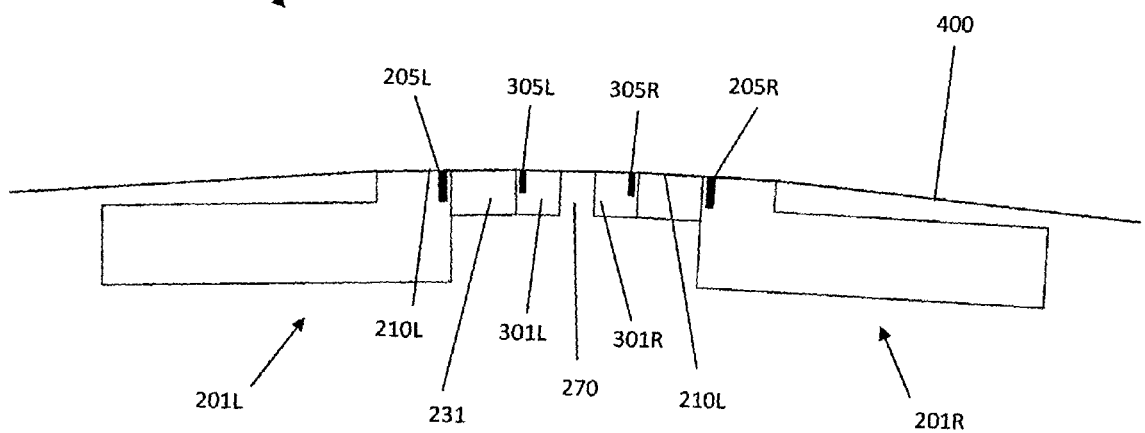

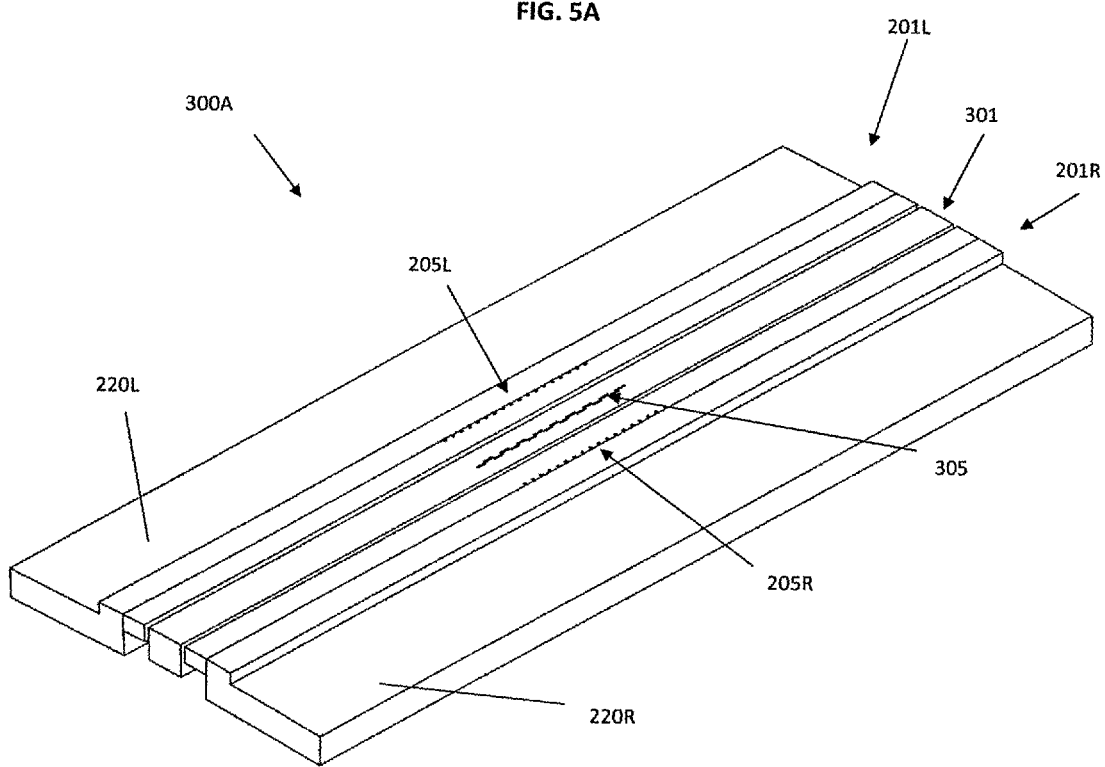

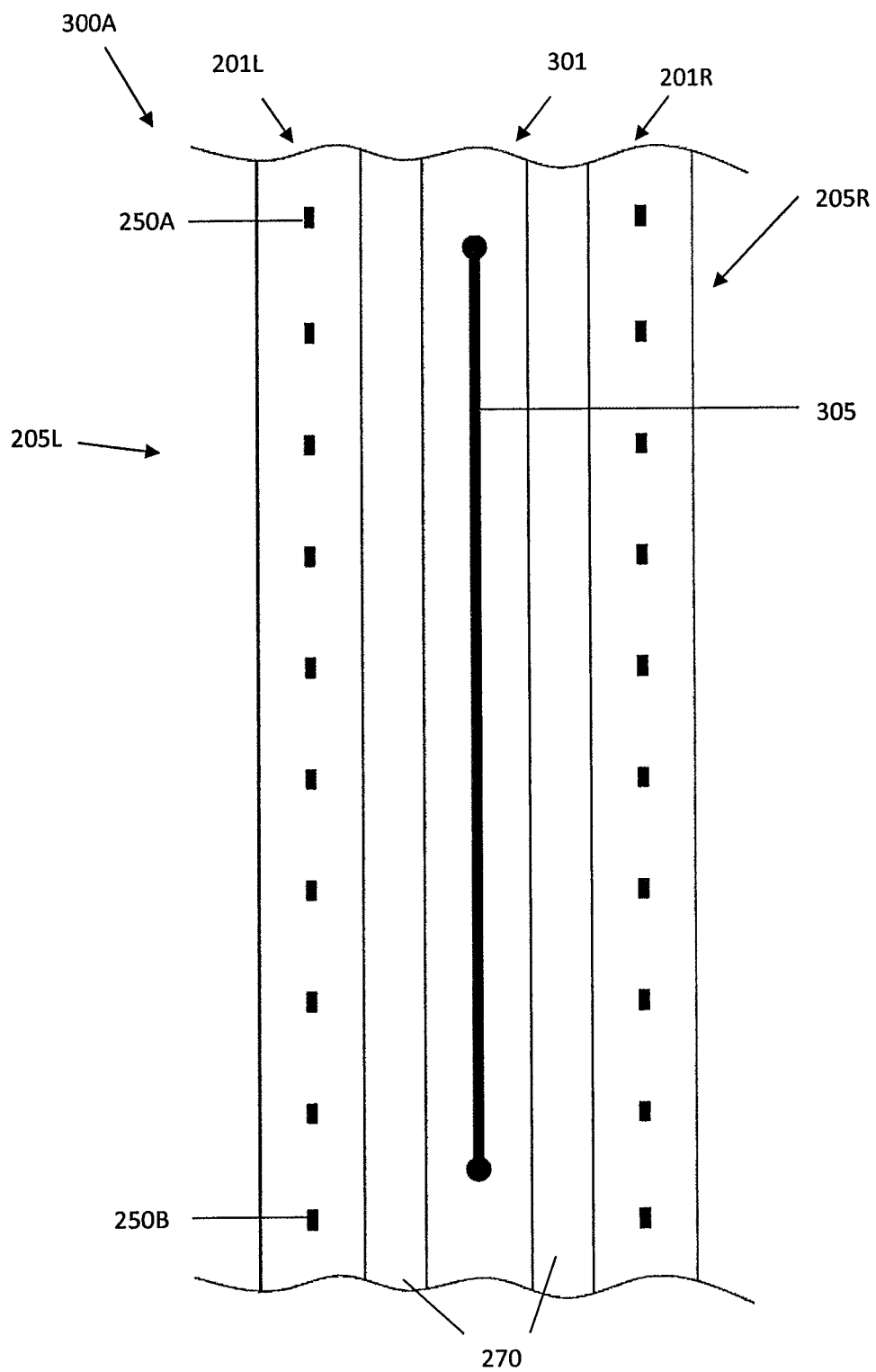

ERASE DRIVE SYSTEM AND METHODS OF ERASURE FOR TAPE DATA CARTRIDGE

CROSS-REFERENCE TO RELATED APPLICATIONS

This application claims the benefit of U.S. Prov. Appl. No. 61/357,836, filed Jun. 23, 2010, titled "Erase Drive System and Methods of Erasure for Tape Data Cartridge," and U.S. Prov. Appl. No. 61/230,576, filed Jul. 31, 2009, titled "Data Only Erase Head," each of which is hereby incorporated by reference herein in its entirety.

FIELD OF THE INVENTION

The present disclosure relates generally to writing and reading data from a magnetic tape storage media and, more particularly, to a secure erasure system for the eradication of the data contained in the data tracks of a tape media such that substantially all of the data can be erased while leaving the servo bands substantially unaltered or within specification. A data tape cartridge erased with such a system can then be reused in a secure data storage environment with complete confidence that any data from a previous usage is not subject to discovery.

BACKGROUND OF THE INVENTION

Conventional tape drives can erase data that has been previously written by using the write head elements of the native read/write head. Such data erasure could be simply a matter of overwriting every track of data with moot information or with DC or AC erasure signals. However, due to the limited number of data channels in a native read/write head and the extremely narrow track widths, using the standard native read/write data heads as found in a conventional drive configuration would take an overwhelming amount of time to erase one tape cartridge. Consequently, more efficient erase schemes have been developed which use specific erasure hardware including an erase head that can erase many data tracks at one time.

For example, many disclosures have been made on the reuse of data tape by erasing and recertifying the data tape, and some efforts have been commercially successful. However, in ultra-secure environments charged with the safekeeping of sensitive data, such as but not limited to bank account information or other private consumer, commercial, or governmental information, these techniques are lacking in their forensic attributes. In particular, data tracks un-erased by such systems remains on the tape.

Some examples of data erasure techniques in use today include open loop systems that erase most, but not all, of the data in the data bands. One system uses a custom designed ferrite magnetic recording head, and another system uses a permanent magnet erase head. In both systems, the width of the erasure head element is less than that of the associated data band. In both of these systems, the erasure technique leaves many data tracks un-erased. These un-erased data tracks are the outermost tracks of the data band and are the data tracks near to or adjacent to the servo bands on either side of the data band. The permanent magnetic erase head also suffers from the fact that it is always on, it is not controlled by a writing coil, and cannot have well controlled edges which in combination with write current can produce a known and reproducible track edge condition.

In general, current open loop erase systems on the market are notorious for leaving 10 to 100 micron wide strips of data bands un-erased, as they would otherwise risk damage to the servo bands, thereby making the tape unusable. The reason for this lack of complete erasure is that the erase heads are not made to precisely match the data band width, and even if made precisely so, the placement of the heads is imprecise. These remnant data band regions are generally adjacent to the servo bands. As a result of the higher areal densities on the most current tape cartridge products, these remnant strips contain more and more information that is left un-erased and open for discovery. This is a significant security issue if a data cartridge is to be redeployed for use by another customer, or for use with another customer's data. Using the current deployed technology of open loop data erase systems, more and more files can be discovered and risk being transmitted to unintended parties. In short, an open loop control combined with the necessarily under-width erase gaps will result in remnant data tracks adjacent to the servo band boundaries.

In order to improve upon this, closed loop erasure schemes have been proposed. However, the conventional closed loop systems lack specific erasure methods to be employed as well as mechanical designs of the apparatus to perform each particular method. The most simplistic of the closed loop methods published teaches the use of one erase element for each data band, but does not speak to the fact that all servo information is localized to a particular data band and further ignores the tolerance stack ups inherent in a data cartridge media.

In part, due to the deficiencies of the techniques previously disclosed, and in part due to the lack of precision in implementing such techniques, there exists a need to implement a novel and robust data erasure system. There further exists a need in the art for a closed loop data erase system with a precision erase head and a precision erase head that enables such a closed loop procedure.

BRIEF SUMMARY OF THE INVENTION

A data erasure system, consisting of a tape drive mechanism, a data erasure head and methods of erasing the data are disclosed.

The present disclosure, in one embodiment, includes a precision data erase head mounted into a read/write head assembly of a tape drive in such a manner that generally mates the precision erase head with the tape drive's read/write head assembly, resulting in a drive that can function as a precision and efficient data erasure drive. In a further embodiment, the tape drive can also function to verify the success of the data erasure. In yet another embodiment, the tape drive can function as a standard data read/write drive in addition to having the added functionality of a data erase drive.

In some embodiments, a precision data erase head may have the ability to erase many data tracks at one time. The erase drive, erase head and the methods used in this disclosure to erase tape are such that erasure occurs substantially only in the data containing regions, leaving the servo tracks substantially functionally unaltered.

In some tape drives, the read/write data head consists of two slider bearing surfaces where each slider bearing surface contains a multi-channel array of read and write elements which are positioned down-track from one another. In the LTO and IBM 3592 formats, the outermost two head elements of each slider are dedicated to reading the servo signals. For example, an LTO 3 head slider has eighteen read/write elements. While the outer two elements are dedicated servo readers, the inner sixteen head elements form a 16-channel read/write head that can read and/or write up to sixteen tracks at one time. The particular sixteen data track locations on the tape are determined by the position signal of the servo read heads which are reading the servo information in the servo band. As the servo read heads move up and down in the servo band, the data heads move up and down in the data band. Typically, the leading slider is used for the servo signal, so that one head slider leads and the other head slider follows depending on if the tape is moving in the forward or reverse direction.

Accordingly, in one embodiment of the present disclosure, a data erase head may be positioned in-between such two data head sliders of a data drive. Alternatively, in another embodiment of the present disclosure, a data erase head can be designed as an integral part of a data read/write head slider or both read/write head sliders.

In one embodiment, the leading head slider can provide a precision servo read signal so the precision erase head can be located into position and remain following this position using the feedback signal. In further embodiments, the trailing head slider may be used to verify that the erasure has in fact occurred.

In one embodiment of the present disclosure, a tape drive system may be in all other aspects essentially a standard OEM tape drive that has been modified by the addition of a precision data erase head according to the present disclosure into the standard head assembly of the drive.

In further embodiments, the mechanical and magnetic design of an erase head according to the present disclosure may depend on which particular erasure technique is to be employed. Several technique embodiments are described in detail in this disclosure.

Because a data read/write head and actuator span one data band and its two associated servo bands positioned on either side of the data band, and also due to other tolerances of the tape itself, in one embodiment of the present disclosure, an erasure of one data band, or a portion thereof, is one erasure method.

In several other embodiments of the present disclosure, methods or modes of complete erasure may be used. Such methods consider the magnetic and mechanical structure of the media itself resulting from the manufacturing and servo writing process.

In one embodiment of the present disclosure, a single-sided erase trim may be employed. In such an embodiment, two edges of a data band may be erased, one on a forward pass and one on a reverse pass. This technique generally takes two passes, or one round trip, per data band, and thus will take, for example, four round trips to erase an LTO format tape (or present IBM 3592 tape) having four data bands.

In another embodiment of the present disclosure, a two-sided erase trim may be employed. In such an embodiment, two edges of data bands, one on either side of the servo band may be erased in a single pass. This technique generally takes one pass per servo band. There are five servo bands in the LTO format (or present IBM 3592 tape), with each of the four data bands having an upper and lower servo band each. Accordingly, this technique generally takes a total of five passes plus, although not necessary, but as is customary, one pass to return to the beginning of tape (BOT). Hence the two-sided erase trim may require three round trips to erase an LTO tape (or present IBM 3592 tape) having four data bands. Both of the above erase techniques only partially erase an entire data band in a single pass, but they can generally erase more than half of a data band in a single pass. They both can be precision aligned to the data band servo band edge or boundary.

In yet further embodiments of the present disclosure, a full data band erase technique may be employed. In one such method, one full data band may be erased in a single pass of the tape. If a single data band erase head is used, for four data bands, a complete tape erasure can be performed in two round trips of the media. In another method for full band erase, an erase head with two data band erase gaps may be used, and as such, a complete tape erasure of four data bands can be performed in one round trip.

In some embodiments of the present disclosure, a precision erase gap edge or edges may be used in combination with a precision closed loop servo placement. The particular method used may be determined by the magnetic and mechanical structure of the media and the statistical deviations in its population distribution.

As discussed above, in current generation time base servo formats, as exemplified for example, by LTO, IBM 3592, and StorageTek T10,000 products, there are four data bands, each one bordered by two adjacent servo bands, thus five servo bands are said to span the tape. The read/write head spans one data band at a time and its associated adjacent servo bands. The position of the data tracks within a data band is controlled by the servo read signal of the associated and immediately adjacent servo bands. Thus, in some embodiments, an accurate and secure full data band erasure technique may include erasing only one data band at a time. For the four data bands of the above mentioned formats, a single data band erase gap will allow for a four pass, or two round trip, solution from BOT to EOT. In some embodiments, this may be the most desirable technique, as it results in a two round trip solution, with each pass only working within the servo bands which are dedicated to the data band being erased in that pass.

In one embodiment of the present disclosure, a fast method of erasure may include one round trip from BOT to EOT and back to BOT, or two passes of the tape. Since there are two passes of the tape, i.e., down and back, only two full data band erase gaps may be necessary to achieve erasure of all four data bands in current generation time base servo formats. However, since only one of the data bands is fully correlated to the servo signals, such an efficient approach can result in erasure errors on less perfect media. Nonetheless, in embodiments erasing two data bands per pass, such as but not limited to one data band on each side of a servo band, and therefore, using only two full band erase gaps as described above, can reduce or minimize errors and tolerance stack ups in the media population as compared to that of embodiments using four full band erase gaps and erasing four bands in one pass. Accordingly, if one round trip is an absolute requirement of the specification, it may be better achieved using two erase band gaps rather than four.

Thus, generalizing some embodiments of the present disclosure, with regard to the methods for use of a full data band erase, we can use one full band erase gap for N data bands to achieve a N pass erasure and we can use N/2 full band erase gaps for N data bands to achieve an N/2 pass erasure. For a four data band tape, for example, this amounts to either a two round trip (four pass) solution and a one round trip (two pass) solution to erase the four data bands. However, the full band methods, as well as any other methods disclosed herein, can be applied to any suitable number of data bands.

In still further embodiments, real-time verification may be employed.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

FIG. 2 is a plan view of an example read/write head assembly.

FIG. 3A is a plan view of a read/write/erase head assembly according to one embodiment of the present disclosure.

FIG. 3B is a plan view of a read/write/erase head assembly according to another embodiment of the present disclosure.

FIG. 4A is a cross section view of a read/write/erase head assembly according to one embodiment of the present disclosure showing the head-to-tape interface.

FIG. 4B is a cross section view of a read/write/erase head assembly according to another embodiment of the present disclosure showing the head-to-tape interface.

FIG. 5A is a plan view of a read/write/erase head assembly according to one embodiment of the present disclosure showing an erase gap array and data read/write head elements.

FIG. 13A is a plan view of a head of the erase method of FIG. 12.

DETAILED DESCRIPTION

Figure 1:
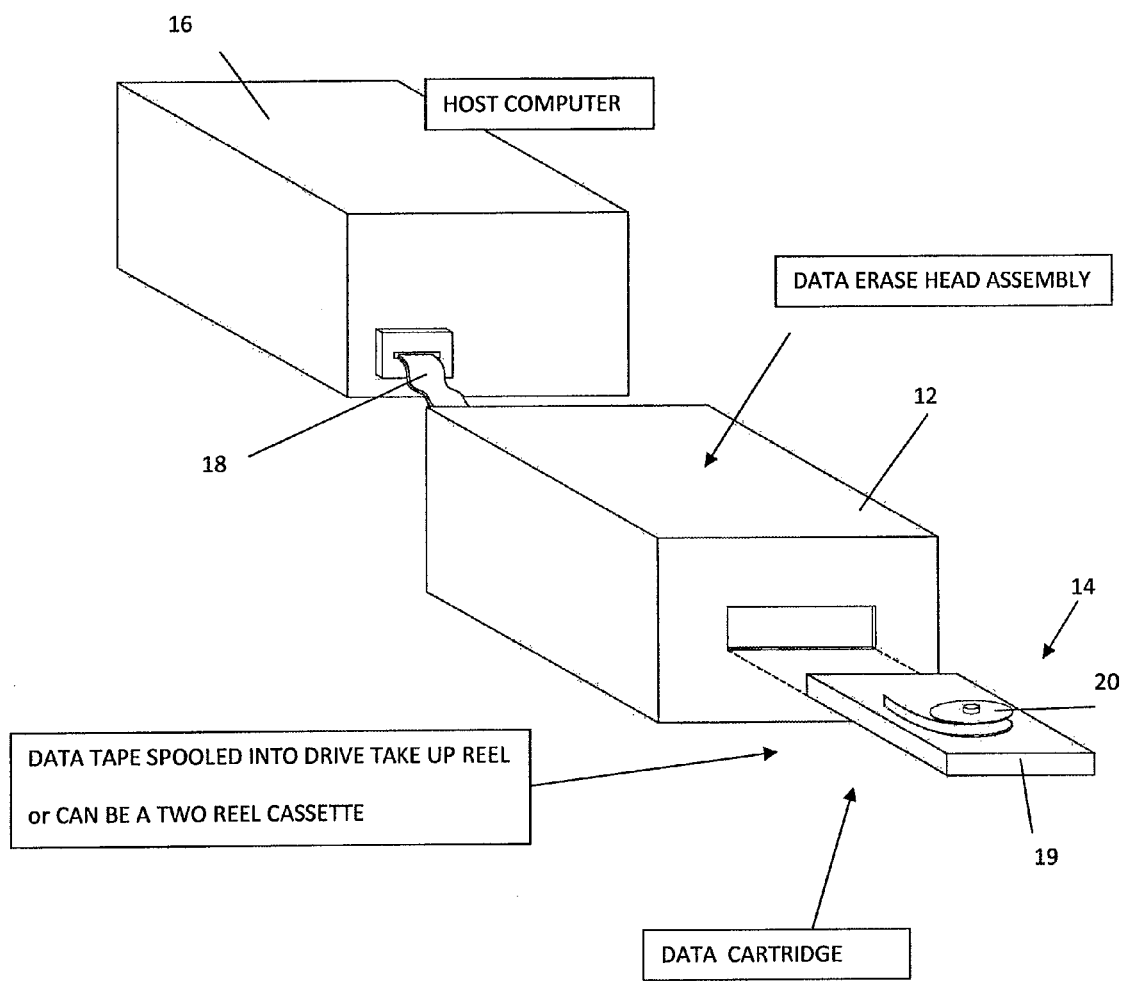
FIG. 1 is a perspective view of a data drive capable of efficient and complete data erasure according to one embodiment of the present disclosure.

The present disclosure relates to novel and advantageous data erase systems including a tape drives having a data erase head that can erase all or substantially all of the data on a tape data cartridge without generally compromising the servo tracks, which are prewritten on the data cartridge as part of its original manufacturing process. In one embodiment, a data erase head may be combined with data read/write heads so that the data erase head becomes an integral part of a novel tape drive system which can efficiently erase all or substantially all the data from a tape cartridge and which also may serve as a data tape drive, if desired, and thereby can also verify the erasure of the data. Such a data erase system is enabled by a precise data erase head, a data erase drive and data erase techniques, all of which are component disclosures of the larger disclosure. A data erase system according to the present disclosure can locate the erase head write elements by means of reading the servo tracks which are part of the tape format. A closed loop control may be used to position the erase head so the data tracks in the data regions are generally fully erased while leaving the servo bands substantially or completely within specification. The data erasure system may be used to verify that erasure has occurred and that data cannot be recovered or it may be used to perform a gross verification of the erasure process in the same pass that the erasure was performed in.

A data erase system according to the present disclosure may be deployed as a single drive with a manual loader, as a more complex multiple cartridge autoloader system, or as part of a data storage tape library with full automation and tracking of data cartridges. Such a system may be used in sensitive data management centers where the potential cross contamination of customer data is a risk that disallows the reuse and redeployment of tape cartridges. The embodiments of the present disclosure allow for redeployment of data cartridges which in turn leads to reduced costs of data tape storage, more efficient use of a center's data cartridges inventory in general, and reduced waste from the disposal of used tape cartridges which cannot currently be redeployed for reasons related to data security and thereby must be destroyed at some cost to the owner and the environment. The embodiments of the present disclosure may lead to new best practices and a more efficient use of data cartridges in the secure data center environment.

The general structure of the various embodiments of the various erase heads as described in the present disclosure may be made in accordance with any method of making magnetic recording heads now known or developed in the future, as modified as described and illustrated herein. For example, the general structures of the various embodiments of heads as described in the present disclosure may be made generally similar to or made in accordance with the magnetic recording heads and methods of making the same as described in U.S. Pat. No. 6,269,533, titled "Method of Making a Patterned Magnetic Recording Head," U.S. Pat. No. 7,386,934, titled "Double Layer Patterning and Technique for Milling Patterns for a Servo Recording Head," U.S. Pat. No. 7,196,870, titled "Patterned Magnetic Recording Head with Termination Pattern Having a Curved Portion," U.S. Pat. No. 6,496,328, titled "Low Inductance, Ferrite Sub-gap Substrate Structure for Surface Film Magnetic Recording Heads," U.S. Pat. No. 6,989,960, titled "Wear Pads for Timing-based Surface Film Servo Heads," U.S. Pat. No. 7,450,341, titled "Integrated Thin Film Subgap Subpole Structure for Arbitrary Gap Pattern Magnetic Recording Heads and Method of Making the Same," U.S. Pat. No. 7,283,317, titled "Apparatuses and Methods for Pre-Erasing During Manufacture of Magnetic Tape," U.S. Pat. No. 7,511,907, titled "Stepped Time Based Servo Pattern and Head," U.S. Pat. No. 7,301,716, titled "Stepped Time Based Servo Pattern and Head," U.S. Pat. No. 6,947,247, titled "Large Angle Azimuth Recording and Head Configurations," U.S. Pat. No. 7,106,544, titled "Servo Systems, Servo Heads, Servo Patterns for Data Storage Especially for Reading, Writing, and Recording in Magnetic Recording Tape," U.S. application Ser. No. 11/017,529, titled "Timing-based Servo Verify Head and Method Thereof," filed Dec. 20, 2004, U.S. application Ser. No. 11/061,253, titled "Magnetic Recording Head Having Secondary Sub-gaps," filed Feb. 18, 2005, U.S. application Ser. No. 12/414,604, titled "Thin Film Planar Arbitrary Gap Pattern Magnetic Head," filed Mar. 30, 2009, and PCT Appl. No. PCT/US09/31798, titled "Recording Heads with Embedded Tape Guides and Magnetic Media Made by Such Recording Heads," filed on Jan. 23, 2009, each of which is hereby incorporated by reference herein in its entirety.

Alternatively, an erase head may be made with more traditional ferrite, MIG, or integrated thin film head technologies. Perpendicular heads using the same erase strategies but with writing poles instead of writing gaps are also considered fully within the scope of the present disclosure.

In one embodiment of the disclosure, a traditional commercial tape drive may be modified to be used to erase the data on the data cartridge. A typical format is that of LTO and IBM 3592, and for this format, the LTO or IBM 3592 production tape drives may be chosen to make a drive that is also capable of erasing data. These latter generations may have better head actuators and if they are backwards compatible to the previous generation of data cartridge they may have better applicability for a data erasure drive as disclosed herein. Such a drive mechanism can be improved upon in a novel manner to make it suitable for the task of erasing the data bands of the data tape cartridge per the disclosures contained herein.

FIG. 1 shows a data tape erase system in accordance with one embodiment of the present disclosure. The system may include a tape drive 12 that accepts a tape cartridge 14 that may be connected to a host processor 16 through data cable 18. The tape cartridge may include a housing 19 having a spool of magnetic tape 20. The system may further include a read/write/erase head assembly, as will be described in more detail below. The tape cartridge 14 may further include magnetic servo transitions written in servo regions on the tape. The system is constructed to utilize the servo control information written on the tape, which gives relative position information used to guide the erase head into a position and maintain its position relative to the servo and data bands on the tape under closed loop servo control. The system may be further optimized to erase large portions of a data band, or an entire data band, or set of data bands in a short amount of time, all the while maintaining a precise alignment of the erase gap edge or edges with respect to the servo band edge or edges. The data erasure enabled tape drive 12 may include a receiving slot into which the tape cartridge 14 is inserted. The host processor 16 can have an embedded computer, a laptop computer, a mini-computer, a workstation computer, a main frame, server level computers, or the like that host tape libraries in a data center.

The erasure tape drive 12 may be a standalone unit in which data cartridges are inserted manually, or it may be an autoloader unit which can be loaded with, for example, twenty four or more tapes at one time, and which may contain two or more drives within the system. Such systems may be configured by the manufacturer. The tape drive unit may be, for example, part of an automated tape library system such as found in large data warehouse centers and in which most all of the tape cartridge handling is highly automated.

FIG. 2 shows a plan view of a conventional read/write data head slider system 200 which consists of two sliders 201L and 201R, denoting left and right respectively in the figure. The two sliders form a leading and trailing pair with each slider being leading or trailing as defined by the tape direction, forward or reverse. Each slider, 201L and 201R, contains a multi-channel array of head elements 205L and 205R, respectively as shown. The number of head elements in this case is eighteen, where the two outermost elements 250A and 250B are used as servo read elements, thus making each head slider a 16-channel read/write data head.

Shown in the figure are regions 220L and 220R which are machined lower leaving the flat lapped surfaces 210L and 21OR to form the slider bearing surfaces proper. Space 270 is the region between the two sliders. The sliders may be flat lapped as in, for example, the LTO and IBM 3592 tape drive systems. In these systems, the flat slider surfaces are made to lie at a slight angles with respect to one another.

In either slider, 201L or 201R, thin film head substrate 230 is used to build the integrated head elements upon. The head elements are only shown schematically, but they also include an encapsulation of very thick alumina, typically 10 um to 50 um in thickness. In disk drive heads, there is no closure element as the head element is located at the tail of the slider. In tape heads, a mechanical mating structure, sometime called a closure 231 is glued to the head bar sliced from the wafer. This creates a continuous tape bearing surface on either side of the head elements proper. This is important for bidirectional recording. Since both sliders of head assembly 200 are made from the same wafer scale techniques, we have only specifically referenced the substrate and closure on one of the two head sliders in FIG. 2.

FIG. 3A illustrates a plan view of one embodiment of the present disclosure in which the data erase head 301 has been placed into the space 270 of the head assembly 200 to make a read-write-erase head assembly 300A. This now forms a head slider system of three sliders with the outboard sliders remaining as the leading and trailing sliders 201L, 201R and the erase head slider 301 is interposed in-between. The flat lapped erase slider plane 310 can be used in combination with flat planes 210L and 210R to form a three-body slider tape bearing interface.

Erase head slider 301 may comprise at least one erase gap 305. Erase gap 305 is shown with a gap edge termination feature 325. In some embodiments, an array of erase gaps 305 may be used to span the same tape width as a single erase gap. Such sets or arrays of erase gaps are considered fully within the scope of the disclosure.

Placing an erase head slider 301 in-between the two data head sliders is one embodiment of the present disclosure disclosure. While a flat head contour is shown for the embodiment, a cylindrical contour, or more complex contour, for the erase head 301 is considered within the scope of the disclosure.

Alternatively, the erase head slider may be made part of the data head slider as shown in FIG. 3B. This embodiment may have advantages in obtaining good head-to-media spacing characteristics in that it is an extension of the read/write head slider, e.g., 201L or 201R. This embodiment maintains the two-body slider assembly used in conventional production drives. In this embodiment, either one or both of the data head sliders 201L or 201R may have an erase member as part of its structure. Erase head members 301L and/or 301R, each having an erase gap element 305L and 305R respectively may share the same contour surfaces 210L and 21OR respectively with the data read/write elements. In this manner, a two-body slider read/write/erase assembly 300B can be obtained. This embodiment may have additional manufacturing advantages in flat head contours, or as part of the original manufacture of a head assembly versus a retrofit addition onto an existing drive.

FIG. 4A shows a cross-section of a three-body slider system 300A with the tape 400. The two outer sliders 201L and 201R can form a standard pair of read/write head sliders with each slider being rotated by approximately one to two degrees from horizontal. The erase head slider 301 is shown such that it can be roughly coplanar to the plane that the tape would naturally transit if the erase slider 301 were not present. By virtue of this design, the tape 400 is made to have close contact over the read/write elements 205L and 205R and erase gap element 305, which have features that reside proximate to the surface planes 210L, 210R, and 310 respectively. This embodiment allows the commercial production drive to be employed as a data erase drive with generally minimal modifications.

Similarly, the erase head slider structure of FIG. 3B is shown in the cross-section of a two-body slider pair in FIG. 4B. The two-body read/write data head slider assembly 300B is maintained with its space 270 in-between the sliders. Each slider 201L and 201R has additional erase elements 301L and 301R, which share the same contour surfaces 210L and 21OR as the data head elements.

As discussed above, the erase head itself can be made from any one of several head manufacturing techniques, including but not limited to fully integrated thin film, MIG, ferrite-ceramics composite, permanent magnet, as well as those new and novel head manufacturing techniques used and proposed for time based servo heads. Timing base servo heads have at least two non-parallel gaps, which dictated new head construction technology. Various embodiments of this new head construction technology are found in the various publications of IBM (such as, but not limited to, Albrecht et al. U.S. Pat. No. 6,320,719; Biskeborn et al. U.S. Pat. No. 6,974,256; Aboaf et al. U.S. Pat. No. 5,572,392) and Advanced Research Corporation (such as those listed above), each of which are hereby incorporated by reference herein in their entirety. The latter head fabrication techniques of Advanced Research Corporation may have significant advantages in written track edge definition and gap pattern layout.

FIG. 5A shows a perspective view of a three-body slider design 300A according to one embodiment of this disclosure. The erase head slider 301 in combination with the two read-write head sliders 201L and 201R may form a good head-to-tape interface that allows for either tape direction to be generally equally well behaved. As such, a three-body slider design can be accurately assembled such that all three slider planes are substantially in contact with the tape at the same time and independent of the direction of the tape, forward or reverse.

As also briefly discussed above with respect to FIG. 3A, in any of the embodiments described herein, it may be useful to make an erase gap that is composed of an array of smaller erase gaps which span the same distance. Multiple gaps would allow multiple exposures of the media to the erase magnetic field. To those skilled in the art, various forms of multiple gaps may be used to generally specify an erase gap group which erases a specified width of the tape. FIG. 5A illustrates one such gap array configuration.

Figure 5B:
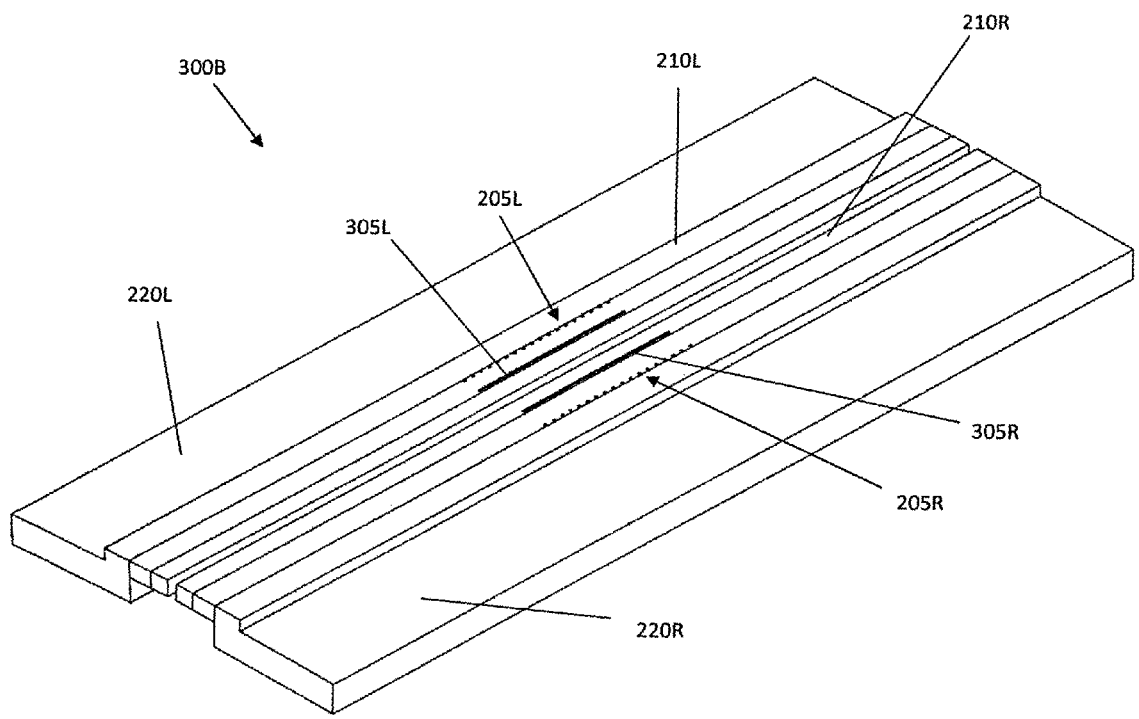
FIG. 5B is a plan view of a read/write/erase head assembly according to another embodiment of the present disclosure showing an erase gap array and data read/write head elements.

FIG. 5B shows a perspective view of a two-body slider design 300B according to one embodiment of this disclosure. The read/write head sliders 201L and 201R now contain erase head elements 301L and 301R, each with erase gaps or erase gap arrays 305L and 305R. As the erase head elements now share the same contours being embedded within slider bodies 201L and 201R, this may form a good head-to-tape interface that allows for either tape direction to be generally and equally well behaved. As such, a two-body slider design essentially conserves the standard head-to-tape interface which is known to be a well behaved contour.

Figure 6:
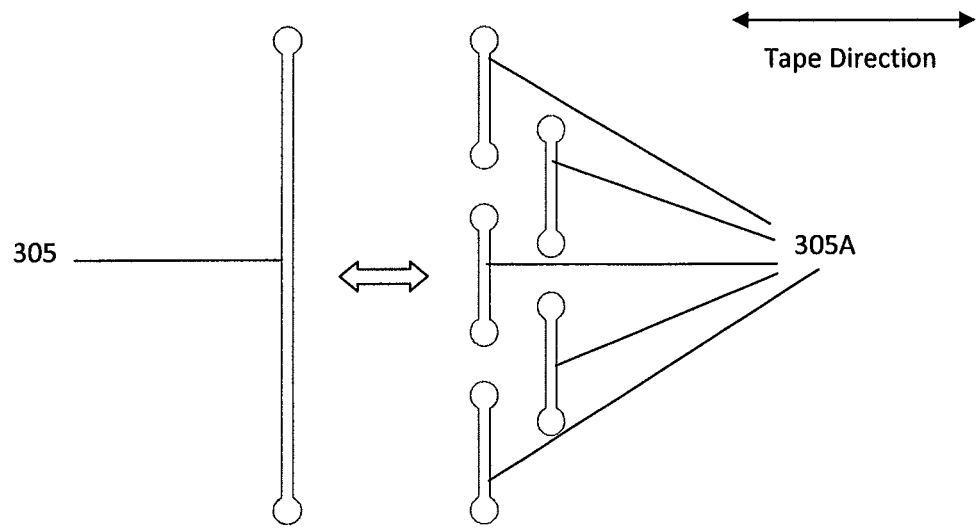
FIG. 6 is a schematic showing an erase gap array to span the width of a single gap according to one embodiment of the present disclosure.

FIG. 6 is a schematic illustrating one example use of a multiple gap array 305A to span the same width as a single gap 305. That is, erase gap 305 may be alternatively be made from an array of erase gaps 305A. In this manner, the exact precision of the outermost boundary erase gap may be optimized; the precision placement of the other gaps may be relaxed, easing manufacturing and implementation processes. This embodiment of erase gaps may be useful for thin film surface head embodiments of the erase head where the surface thin film carries the magnetic flux. While a specific configuration of erase gap array 305A is shown, the embodiment of FIG. 6 is for illustration purposes only and is not meant to be limiting. Any suitable configuration of an erase gap array may be used.

Figure 7:
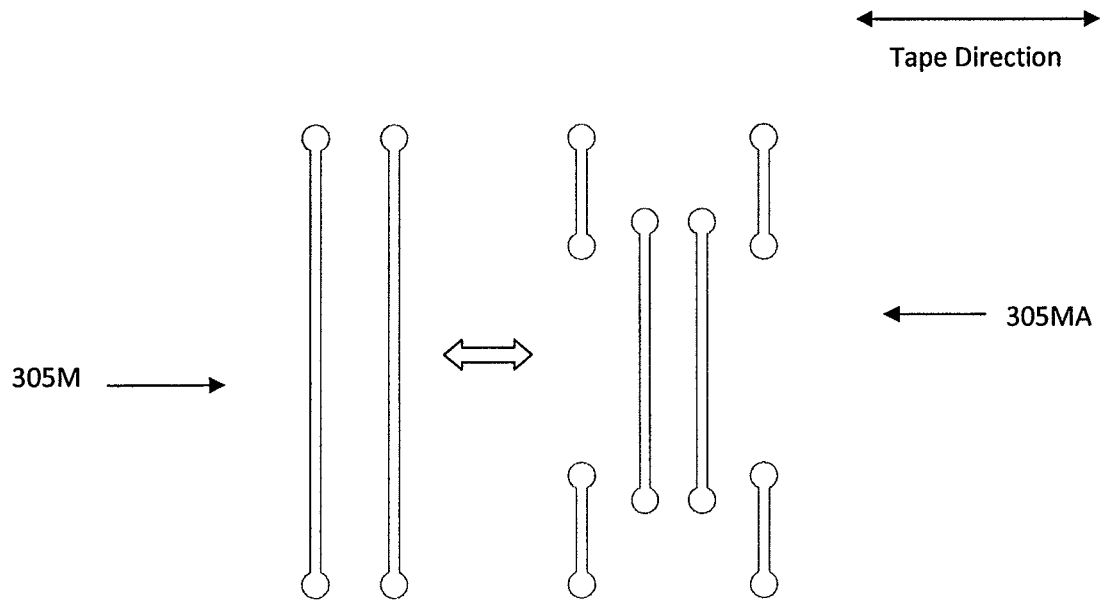
FIG. 7 is a schematic showing an erase gap array to achieve multiple erase field exposures across a data band in a single pass according to one embodiment of the present disclosure.

FIG. 7 shows another array of erase gaps 305M. In this approach to erasure, the array of erase gaps 305M can be used to provide for multiple exposures of the media to the erase magnetic field. Multiple exposure to the erase magnetic field can reduce remnant magnetization of the magnetic media. This can increase procedural efficiency and security of data erasure. Like the gap array 305A of FIG. 6, this can be done using any suitable configuration of an erase gap array, such as that shown as 305MA.

Figure 8:
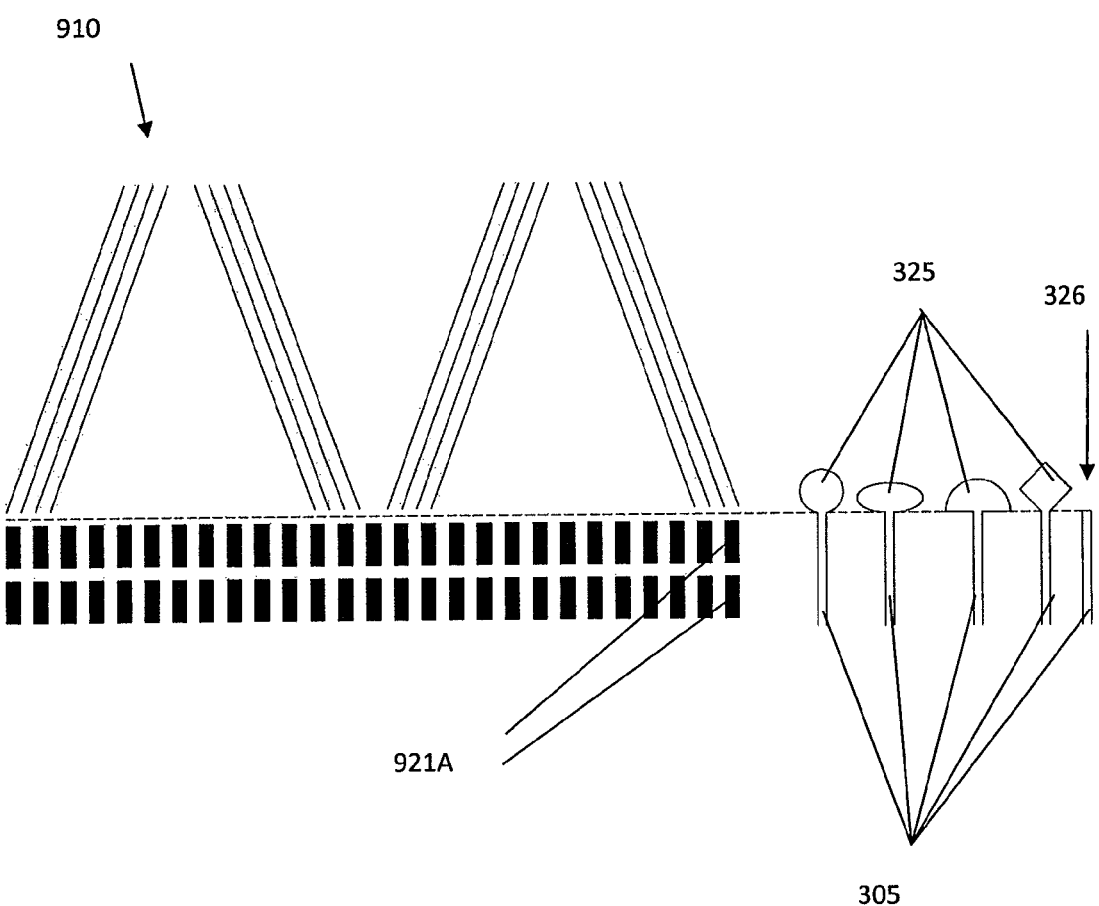
FIG. 8 is a diagram showing the use of precision gap termination patterns in a surface film erase head according to one embodiment of the present disclosure.

FIG. 8 shows erase gaps 305 with example termination patterns 325. The termination patterns 325 shown are for illustration purposes only, and are not meant to be limiting. The termination patterns 325 may be used to provide better quality edges to the erase gaps 305. Note the use of elliptical and other termination patterns 325 at the edges of the gaps 305 ready for erasure of data tracks 921A adjacent to servo band 910. In some embodiments, the terminations 325 of the gap edges that are adjacent to the servo bands can be very important to the erasure quality adjacent to the servo bands.

Termination patterns that leave the servo band unaltered or substantially unaltered and not diminished in its magnetization state near its boundary can be desirable. In some embodiments, therefore, it may be important to leave the servo bands unaltered or substantially unaltered, or if altered, they may be altered so slightly that they remain completely within specification. Thus, even if the erase method contemplates some slight decrease in the width of the servo band to ensure all the data has been erased from the adjacent data tracks, the erase field gradient can be very sharp and controllable. The use of precision geometry erase gap termination patterns 325, as disclosed in U.S. Pat. Nos. 7,196,870 and 7,386,934, each of which is incorporated herein by reference in its entirety, are to be fully considered as a feature of particular embodiments of this disclosure.

We now turn our attention to the methods of erasure that may be used with the various embodiments of tape erasure systems described herein. Tape is formatted as part of a manufacturing process which uses precision tape transports and servo heads. After the media is formatted, the media is assembled into the tape cartridge proper. The tape is not formatted as a cartridge in a drive as this would be less precise, require much more time and therefore be very expensive as compared to factory formatting of long lengths of the tape media.

The servo format of the media has a specification with tolerances related to each component of the specification. Tape media is flexible and expands and contracts as a result of such environmental factors as temperature and humidity. It is not rigid, as compared to a hard disk medium for example, and therefore, it also stretches mechanically under tension. The format makers, typically the drive companies, set the specifications for where the servo band patterns are located on the tape and also where the data tracks are located on the tape with respect to those servo patterns. As a result of very practical technical considerations, there are numerous tolerance stack ups in a given media format which are related to the entire media manufacturing and servo writing process. The servo head is also a component of the tolerance stack up.

Hence, there are populations of media that meet the specification of the servo and data bands but do so in slightly different ways. In order to have 100% or substantially 100% erasure of the data bands and not affect the specification of the servo bands, there may be a dependence on how true the specific tape cartridge was to the centerline of the design specification. As a result, if one designs and utilizes a multiple full data band erase gap system to the center of the specification, it is quite possible that using the erase gap system will result in a large percentage of a given population divided into two subsets of erased populations. It is quite probable there will be a subset of the population that are perfectly well erased and with no damage to the servo bands. Likewise, there may be a subset of the population that is not properly erased or which have may damage to the adjacent servo bands. This situation may occur, for example, when using a multiple full data band erase head that erases two or more data bands simultaneously. Hence the use of a full data band erase head may require the screening of the data cartridge prior to using this method of erasure. This is fully considered as a part of this disclosure.

The specifications just discussed are that of the layout of the servo and data bands on the tape. In the LTO format, the layout within one data band is much tighter than the layout of where one data band is positioned relative to another data band. This is because the drive and read/write heads work with and span one data band at a time.

Until a particular media cohort is well understood or characterized, and this analysis is considered a component of the erasure system of the present disclosure, it is prudent to have various different methods with which to erase the tape. Some of the erase methods disclosed will work well with any tape cartridge meeting the media specification, while the most efficient erase methods disclosed may work well with more perfect tape media cartridges. The more conservative of the erase methods disclosed may limit or eliminate the amount of screening and characterization required prior to initiating the erasure process, but they may take longer to erase all of the data tracks on the data cartridge.

Figure 9:
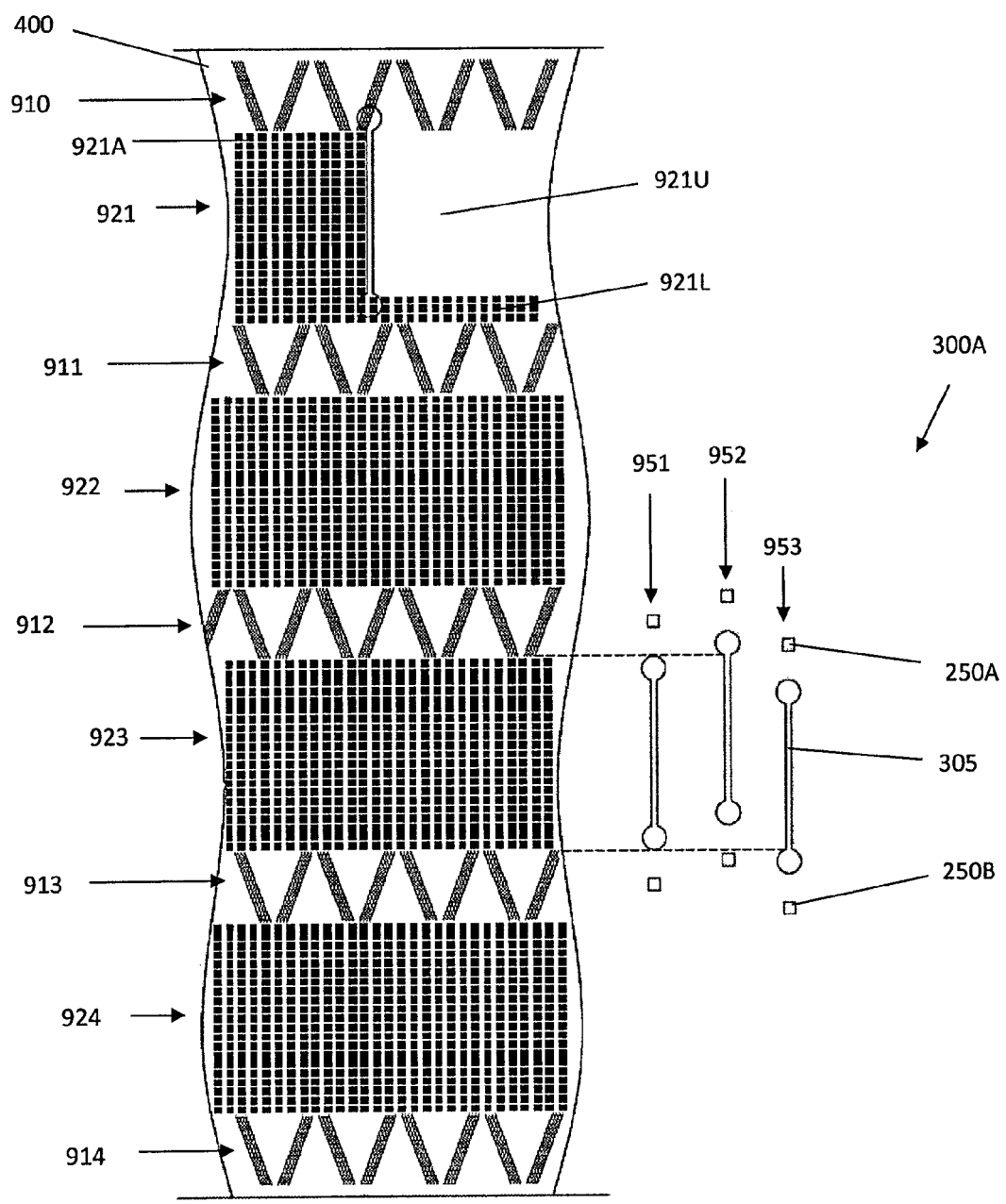
FIG. 9 is a schematic of a single-sided erase trim method according to one embodiment of the present disclosure.

FIG. 9 schematically illustrates an erasure method referred to herein as single-side trim erase. The method may be used to erase the upper and lower data band edges of a particular data band, in separate passes of the tape, while also erasing over half of the data tracks in the data band on each pass. For ease of illustration, example head elements of the head system 300A are shown schematically across from the third data band 923. In this method, an erase gap 305 may be aligned generally in-between servo readers 250A and 250B, as shown, with the erase gap 305 being less wide than the data band but wide enough such that it can cover the entire data band in two passes of the media. An erase gap 305 is shown in a neutral position 951, in an uppermost position 952, with the erase gap 305 edge adjacent the upper edge of the data band, and in a lowermost position 953 with the erase gap 305 edge adjacent the lower edge of the data band. Thus, the data band may be covered using two servo positions, such as an uppermost position 952 and a lowermost position 953, one for each pass.

Turning to discussion of the head system 300A now shown on the first data band 921, the head system 300A is illustrated erasing the upper part of the first data band 921, resulting in erase region 921U which includes the data band adjacent track 921A. It will take two passes to completely erase data band 921. Two passes of the media is one round trip or one "down-and-back" as it is sometimes referred to. On the second pass, the erase head system 300A can be aligned in a lowermost position, e.g., 953, to erase region 921L. After erasing data band 921 in one round trip, the process is repeated after moving the head 300A to the next data band, e.g., 922. Accordingly, for media having four data bands, this method may use four round trips of the media. The single sided trim erase just described will take advantage of using the servo bands that relate to the placement of the data within the bands and thus may be every effective at erasing all of the data track that is directly adjacent to the servo band. Either one or both servo bands and associated signals adjacent to a data band may be used to accomplish this method.

While this method offers extreme precision, it has the limitation of making one round trip per data band. Generally, there would be N round trips for N data bands using this technique, or for example, four round trips for the four data band LTO format.

As discussed above, in current generation time base servo formats, as exemplified for example, by LTO, IBM 3592, and StorageTek T10,000 products, there are four data bands, each one bordered by two adjacent servo bands, thus five servo bands are said to span the tape. Accordingly, for simplification of discussion, the erase methods described herein are discussed with reference to four data bands and five servo bands. However, it is recognized that other formats or formats for future generations of media may include a greater or fewer number of data bands and/or servo bands. Accordingly, it is understood that the various embodiments of erase heads and erase methods may be translated to formats with greater or fewer numbers of data bands and/or servo bands without departing from the spirit and scope of this disclosure.

Figure 10:
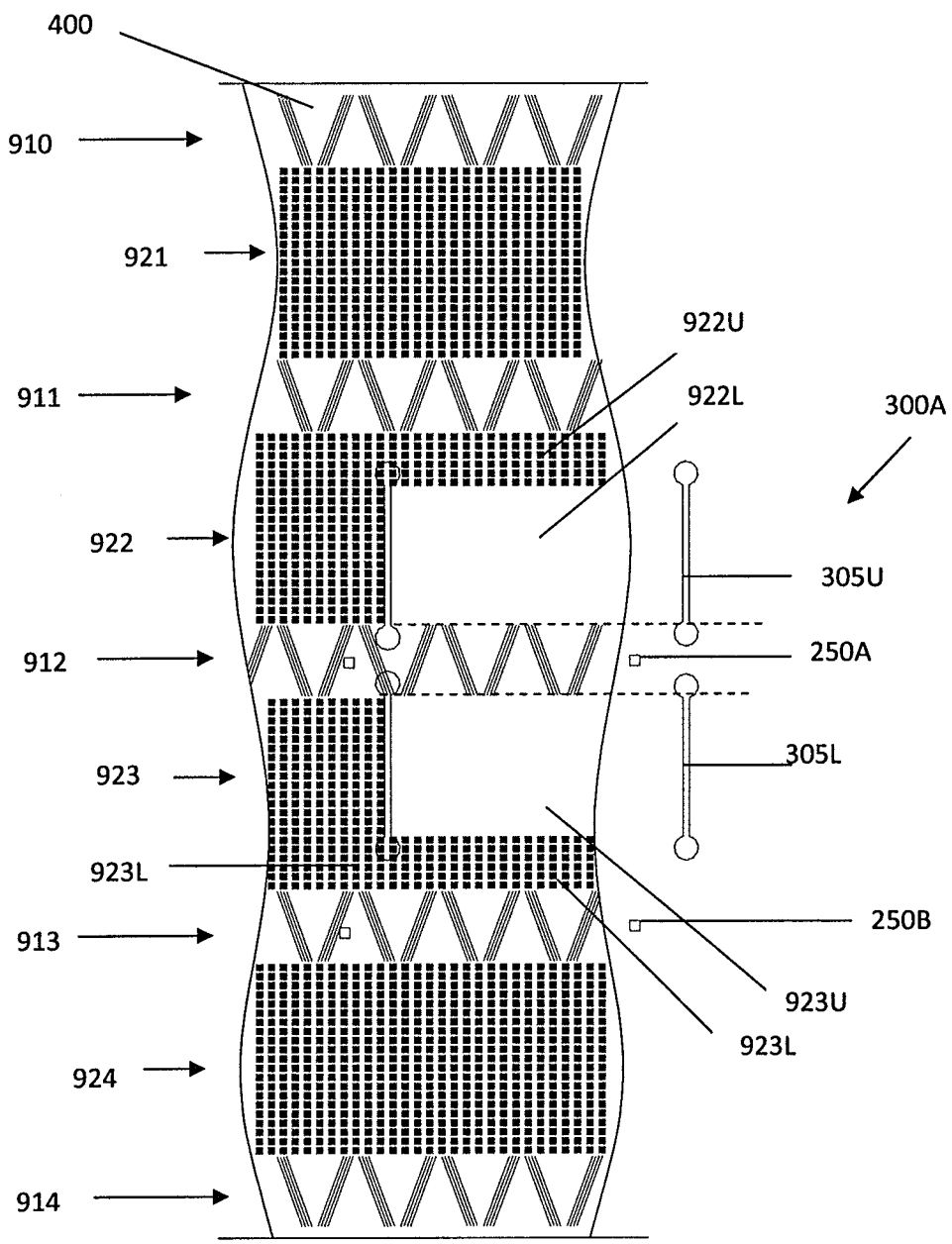
FIG. 10 is a schematic of a two-sided erase trim method according to one embodiment of the present disclosure.

FIG. 10 schematically illustrates an erasure method referred to herein as two-side trim erase. The method may be used to erase the data tracks adjacent to edges of a particular servo band in one pass while also erasing over half the data tracks of each of the two data bands on either side of the servo band on each pass. Note, the uppermost and lowermost servo bands will only have data bands adjacent to one side, so the discussion will be understood to be inclusive of this fact.

The head elements of the two-sided trim erase head system 300A are shown schematically across from the center servo band 912 and data bands 922 and 923. In this method erase gaps 305U and 305L may be aligned generally on either side of a particular servo reader. In the figure shown, the erase gaps are aligned relative to servo reader 250A. Here the erase gaps 305U and 305L are less wide than a data band but wider than half of a data band, such that they can cover the entire data band on two passes of the media.

The two-sided trim erase head system 300A is shown in a neutral position. This will also be the position for erasure. The erase gaps 305U and 305L may be made to have a precision distance from their writing edges adjacent the upper and lower edges of the servo band. In this way, the servo band edges have over half of the data tracks on either side of the servo band, including the two most adjacent data tracks, erased. The data will be erased in the regions denoted as 923U and 922L and these regions are located in two different data bands on either side of the servo band being used. The effective non-erase distance between the inside erase gap edges is a function of the magnetic edge write effect of the gaps proper. This will be discussed in more detail below.

As shown, it will take one pass per servo band to completely erase data across the tape. Since there are five servo bands in, for example, the LTO format, there will be five passes made. As the tape typically is returned to its home position, this will actually use six passes as the fifth pass leaves the tape at the wrong end of the system. Thus, three round trips are used to erase the tape if there are five servo bands.

If the movement of the head actuator is limited, this approach may utilize two electrically independent erase channels, with the extra channel used to span the last data band, which may be out of reach due to the excursion limit of the head actuator. In such an embodiment, an extra erase gap channel could span the 250B servo read element position, as 250A cannot reach servo band 914 in this case.

The two-sided trim erase just described will take advantage of using the servo bands that relate to the placement of the data within the bands, and thus can be every effective at erasing all or substantially all of the data tracks while substantially maintaining the original specification of the servo bands. Either one or more servo signals may be used to accomplish this method.

While two-sided trim erase offers extreme precision of clipping the servo band adjacent data tracks, it has the limitation of making one round trip per servo band. Generally, there would be M passes for M servo bands, or three round trips for the LTO format, using this technique, making it slightly faster than the single-sided trim erase method.

Figure 11:
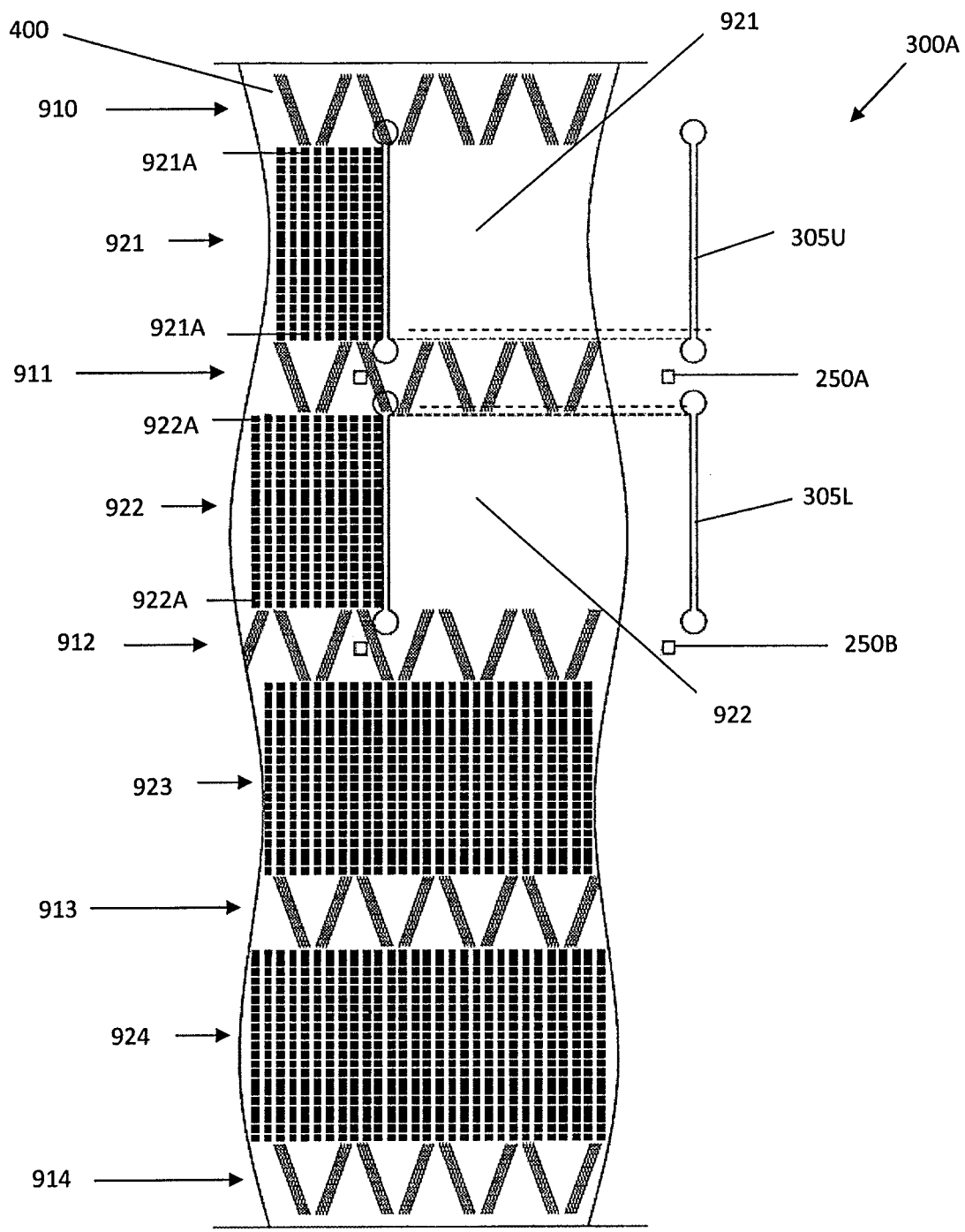
FIG. 11 is a schematic of a full data band erase method according to one embodiment of the present disclosure.

FIG. 11 shows another method referred to herein as full data band erase. This is can be an efficient and/or fast technique. In this embodiment, N full band erase gaps for N data bands could be employed. However, this is not necessary and can be generally have less precision due to the tolerance stack ups, noted above. Conventional systems having an erase gap for each data band miss at least two cardinal points including 1) tolerance stacking and 2) returning to the beginning of tape (BOT) from the end of tape (EOT). Thus, if there are N erase bands for N data bands, two passes are still used—one to erase the data and one to return to BOT.

According to one embodiment of the present disclosure, therefore, for N data bands, N/2 erase bands or gaps, instead of N erase bands or gaps, may be used to fully erase all data bands on one round trip, or down-and-back traverse of the tape. An improvement of a one round trip technique would be the use of N/2 erase elements which can accomplish an entire tape erasure in the same amount of time with more accuracy. Particularly, using just N/2 erase elements, erasing two data bands per pass, can result in a more accurate data erasure profile as it mitigates tolerance stack ups across the entire width of the tape.

Similar to the two-sided trim just discussed, in an embodiment of full data band erase, erase gaps 305U and 305L can be located such that they span a servo band 911 that lies between them. However, in this case, the edges of the erase gaps opposite the servo band should also preferably be made to high precision. This is because rather than just spanning over half the data band as shown in FIG. 10, the gaps can be made to span the entire data band. Specifically, erase gaps 305U and 305L each span a full data band and have a distance between their inside gap edges that generally equals that of the width of the servo band between them. The outside edges should preferably be precisely designed to take into account the tolerance stack up across two data bands and to match, as best they can, the servo and data boundaries they are associated with. In some embodiments, a single servo band may be used to position the head; however, in other embodiments, a mixture of two or more servo signals may be sued. For example, the system may servo to servo bands 911 and 912 while data bands 921 and 922 are erased.

In one embodiment, an analysis may be performed by the two servo readers. In the case of LTO, for example, the two servo readers have an exact pitch of 2,885.8 um which matches the specification of the servo band pitch bordering a data channel. If the servo readers match within a predetermined small deviation from the ideal pitch, the erasure can proceed. If the deviation of the pitch is outside the predetermined small deviation, the erasure effort may be called into question and the erase procedure can be abandoned for that particular tape cartridge.

Figure 12:
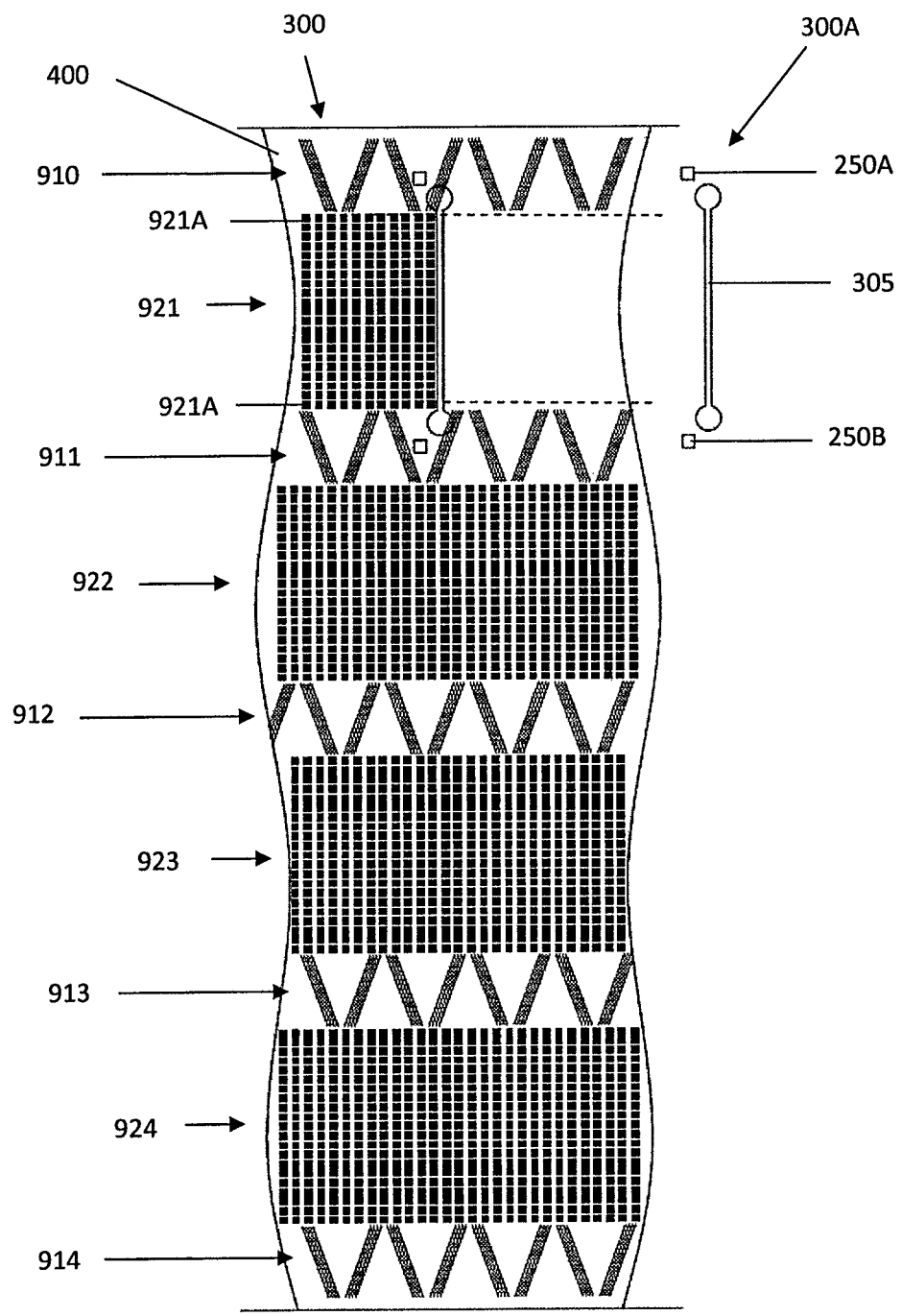
FIG. 12 is a schematic of a full data band erase method according to another embodiment of the present disclosure.

In another embodiment, a more conservative approach to the full data band erase embodiment of FIG. 11 is shown in FIG. 12. In this embodiment, only one data band may be erased per tape pass, thereby requiring four passes or two round trips for a four data band tape media, such as LTO or IBM 3592. In one embodiment, there may be one erase head gap element 305 or erase gap array in the read/write/erase head system 300A. The erase head gap element or erase gap array may be centered on, or associated with, one or two servo read elements, such as servo read elements 250A and 250B, of the read/write sliders.

The specific implementation of the erasure method may depend on the tolerance stack ups. As an example, let us assume that the pitch between the servo centerlines are off by +3 um from the LTO servo pitch specification of 2,858.8 um, picking 2,861.8 um, for example. In this case, the data band edges may be further from the servo band edges and one can adjust the erase gap location by 1.5 um to remain on the actual common centerline of the two servo bands. This may be done by servo actuation, using the two servo read signals as references.

In another example, the LTO servo band width specification is from 186 um to 192 um. If the servo band is written at the 186 um width, versus the 192 um width, the data band will be further from the servo band. The inverse is also true. If the servo band is written at the 192 um width, versus the 186 um width, the data band will be closer to the servo band edge and in some situations may intrude and overwrite a very small portion of the servo band. The possibility of these variations is intrinsic to the specification of the given tape data storage format under consideration, such as the LTO format.

In tape data storage systems and cartridges, tolerance errors accumulate in complicated combinations across the entire media population, which is accounted for in the erase system of this disclosure. To accommodate the various accumulated errors in a particular media cartridge, the various embodiments of erase systems described herein may have a combination of metrology and erase strategies to ensure complete data erasure while leaving the servo bands within specification.

An additional non-mechanical servo strategy, a magnetic field servo strategy, may use erase current adjustments to compensate for errors relating to data track and servo band positions. Current compensation may be incorporated into the servo feedback. This would allow effective erase head element servo without actual physical motion. The electrical current supplied to the erase head energizes the magnetic gap 305, which has a certain designed width to accommodate the tolerance stack-ups in a data band. Over a certain range of parameters, increasing the electrical current to the erase head will cause the magnetic gap to "bloom" or increase, wherein the magnetic erase width of the erase gap increases. Thus, by managing the magnitude of the electrical current to the erase head, it is possible to dynamically adjust the magnetic erase width of the erase gap. This novel technique allows dynamic control of the effective width of the erase gap to accommodate tolerance stack-ups in the data band and tape being erased. The position mismatch of the servo band locations may be used to call out a specified write current, such that a fine adjustment can be made to the magnetic field location of the erase edge.

Erase current compensation information, such as how much displacement of the erase field is obtained for a given current value may, be placed in a look up table so that exact current compensations can be made a part of the data erase system. The exact nature of the erase field displacement will depend on the erase gap termination used, if any.

The technique of current compensation for adjusting the erase gap edge bloom field displacement is to be considered fully within the scope of the disclosure. Likewise, the technique of current compensation for adjusting the erase gap edge bloom field displacement as a fine servo feedback component, or variation, is to be considered fully within the scope of the disclosure. These techniques apply to all data erase embodiments described in or contemplated by the present disclosure.

In the full data band erase method, generally for N data bands, the erase elements employed would be a N/N or 1 erase element per data band as shown in FIG. 12, and up to N/2 erase elements, depending on the tolerance stack-ups as shown in FIG. 11. The latter N/2 erase elements will allow for a greater speed of erasure of a full magnetic tape, one round trip from BOT to EOT and back to BOT.

Verification that the data has been erased can be an important component of a data erasure system. In one embodiment of a data erasure system, the trailing data read elements may be used to read data tracks while the erasure is taking place. If the system has failed, for whatever reason, the read heads will detect data which was not successfully erased, and the process may be stopped. The embodiment using the read/write data head slider, specifically in a two slider body system, in combination with an erase head allows for verification of erasure to take place concurrently with the erasure process. Use of the leading position read/write head slider as the servo reader, in combination with the middle position erasure head and in further combination with the trailing position read/write head slider as the erasure verification reader is one preferred embodiment of this disclosure.

Figure 13B:
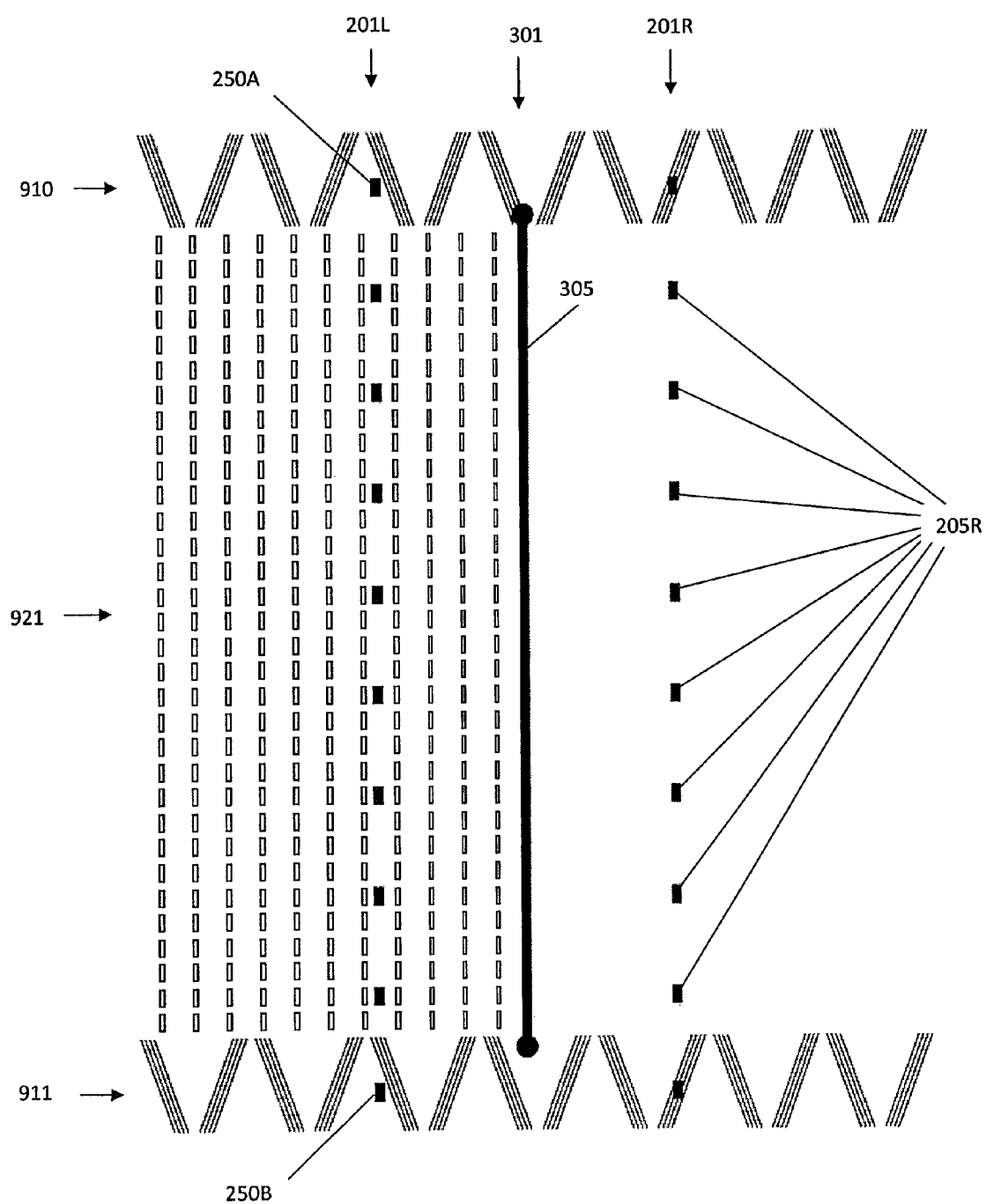
FIG. 13B is a plan view of an erasure method of FIG. 12 coupled with real time verification according to one embodiment of the present disclosure.

FIG. 13A shows a read/write/erase structure plan view of an embodiment of this disclosure in slightly more detail than shown in FIG. 12 and FIG. 3A. FIG. 13A illustrates an embodiment of the read/write elements of slider body 201L, the erase gap slider 301, and the read/write elements of slider body 201R as such may be used in FIG. 13B described below.

FIG. 13B shows a verification embodiment of a two round trip technique as described with regard to FIG. 12. The leading slider 201L may be used as the servo reader through read elements 250A and 250B for the servo read feedback loop. The data erasure element 301 may contain an erase gap 305 or erase gap array which erases the data band. The trailing slider 201R may be used as a data reader through its reader elements 205R. This allows for real-time verification that erasure has occurred as there will be no data signals from the data readers of the trailing slider for successful erasure. Some of the slider body detail of FIG. 13A has been omitted to better display the erase and reader structures of this embodiment.

Current technology erase systems use other drives for data erasure verification. So the real-time verification that is allowed by some of the embodiments of this disclosure can be advantageous. In practice, it is generally impractical to verify every portion of a data tape, as that would take hours per tape to accomplish. Alternatively, if we verify that various data tracks accessed by the trailing slider read elements have been erased, we can infer that all the data tracks underlying the erase gap or gaps have been erased. This can be confirmed statistically by statistical process control groups. Verification metrology performed on control groups of tape may confirm that if the trailing edge read elements can read no data, then there will likewise be no data tracks in that data band. In this way, real time verification can be achieved which will result in a more efficient process.

An important verification step may be to attempt to read signals from the most adjacent data tracks. This would require a non-centered initial set-up for the erase gap alignment with respect to the servo read elements. In other words, while the data head was located on a most adjacent data track, the servo read element and erase gap relative position would be such that the servo read element was at its uppermost position on the servo band, or alternatively on its lowermost position on its servo band while the erase gap was centered on the data band proper. While this is entirely possible and fully within the scope of this disclosure, it may require a very difficult alignment operation. A more thorough verification may be done statistically on selected cartridges in another drive dedicated to verification only. This is yet another verification technique. In such an off-line verify system, all N×2 adjacent tracks of an N data band system can be checked for data. This level of verification may be employed as part of the development process or in actual practice of the overall erasure and verification technique, however, the reading of all N×2 data band edge tracks would not likely be a real-time verification process without multiple head actuators.

The real-time verification as discussed with respect to the erasure technique of FIG. 13B is equally applicable to all the embodiments described in this disclosure. Such real-time verification may be obtained by the use of the product drive read/write data head assembly in conjunction with the erase heads shown or otherwise described in this disclosure. This is yet another advantage of the embodiments of this disclosure which use otherwise native OEM read/write head systems. In particular, if drive makers wish to add the erase features described herein to their product of OEM drives, then the application of the dual head module as described in FIGS. 3B, 4B, and 5B may be of particular interest.

While erasure has occurred, the scientific forensic question will be to what level has erasure occurred. This can be a function of the erase current, the frequency of the erasure if any other than DC is used, the magnetization of the erase gaps, the coercivity of the tape medium, the thickness of the tape medium, the frequencies of the data, and a host of other parameters. It will be likely that the system will be designed to erase the data to below some threshold SNR limit, say negative 40 dB, or some other factor such that an industry accepted specification can be said to have been satisfied.

Figure 14:
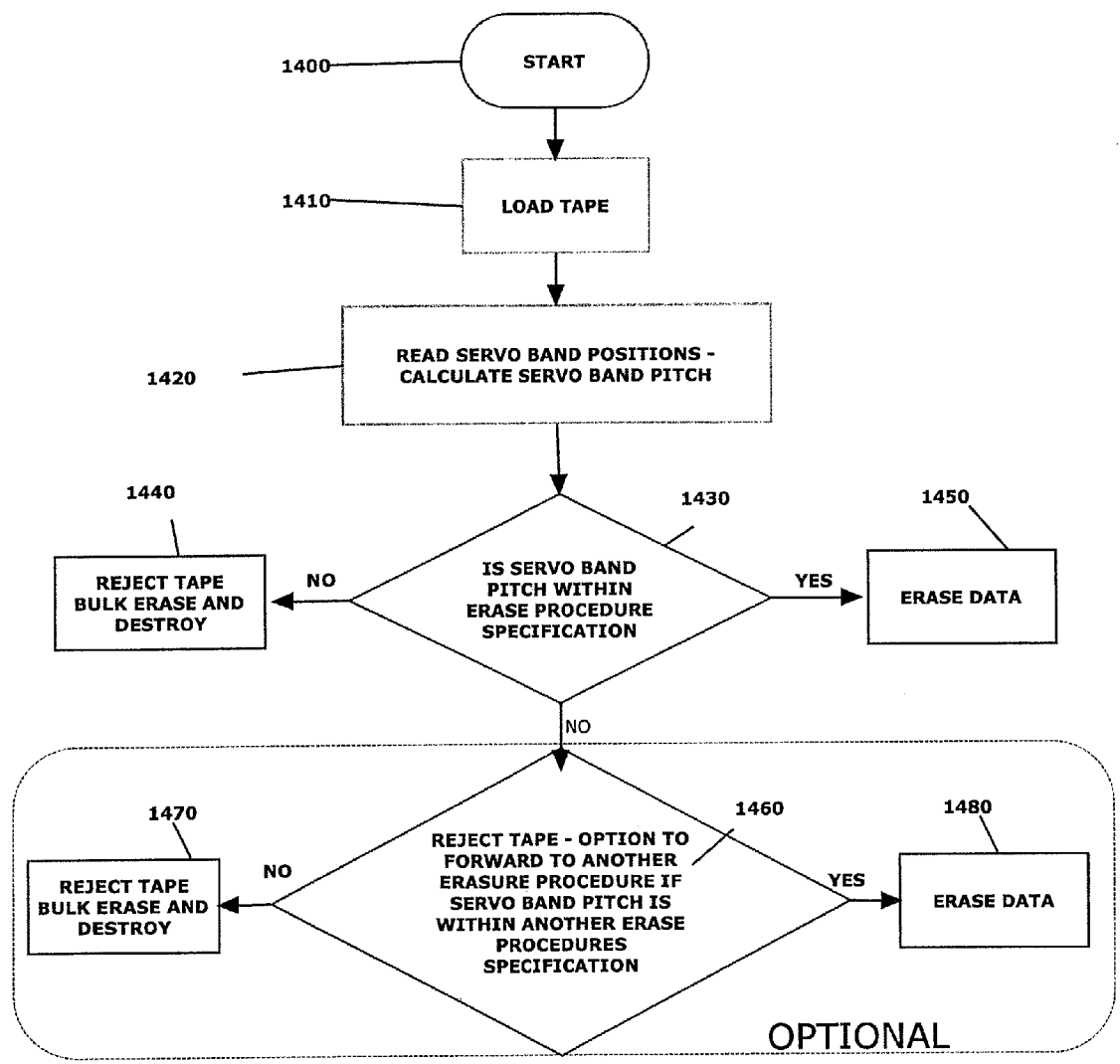
FIG. 14 is a flow chart of a data erase method for a tape cartridge according to one embodiment of the present disclosure.

An example of a process for using some of the erasure embodiments of the present disclosure is illustrated FIG. 14. As shown in steps 1400 and 1410, the process may initially include loading a tape media. The servo band positions may then be read, and the servo band pitch calculated, as shown in step 1420. Next, at step 1430, it may be determined if the servo band pitch calculated is within specification for the erase procedure. If it is, the data may be erased at step 1450. If the pitch is not within the specification, then the tape may be rejected and optionally destroyed in step 1440. As an alternative, if the pitch is not within the specification, an option to forward the tape to another erasure procedure may be provided at step 1460. If the pitch is within the specification for the other erasure procedure, then the data may be erased, as shown in step 1480. Otherwise, the tape may be rejected and optionally destroyed in step 1470.

Expression of the embodiments contained herein to servo read-only sliders are to be fully considered within the scope of the disclosure. An erase head made with permanent magnet elements having an external magnetic field with precision magnetic edge boundaries to simulate an erase edge should likewise be considered within the scope of the invention. In some instances, however, such a head may not be a preferred embodiment as it cannot be turned on and off and may not be made of materials reasonably compatible with the head-to-tape interface. Such a head does possess a very large external field which can be used in a closed loop system, if its advantageous attributes are desired over an electrically driven erase head. With an electrically driven erase head, it may only be energized once it is servoed into position, and thereby, for a full band data erase width element, it has large advantages over the permanent magnet head which cannot be turned off for excursions into forbidden-to-erase territory.

This disclosure describes a data erase system that can be made in one embodiment as part of a new drive technology with factory supplied erase head elements being used alongside read/write head elements, so that efficient data erasure can be part of its natural capability. Alternatively, another embodiment is described that is additive to a modified product drive so that it is enabled to perform efficient data erasure. Similarly, the use of factory read/write data heads allow for the real-time verification of the erase process. Furthermore, the use of the factory head slider and actuator mechanism allows for an economical advantage or making a custom actuator. For reasons of data security, the methods of this disclosure will allow for the secure erasure of the most challenging media.

New generations of media may have nine servo bands and eight data bands, a logical and obvious extension of today's formats. On such a system, the expectation is that the band pitches will be more precise than that of the current products using the five servo, four data band servo system. In the 9/8 system, for example, the number of erase elements may be one, two, four, or eight, with the four and eight full band erase elements being able to erase all the eight data bands with one round trip of the media.

This disclosure is discussed in terms of one head actuator, as this is the usual case. However, the teachings of this disclosure can be applied to multiple head actuators in a given date erase head assembly, and such embodiments should be considered fully within the scope of the disclosure.

The business model embodiments enabled by the disclosures contained herein, are multifold. At one end of the spectrum they may be service based, in which large quantities of segregated tapes can be erased and verified as an in-house service, or as an out-sourced service being done on-site. Moving un-erased or data containing tapes off the premises is a security risk that certain markets want to minimize. At the other end of the spectrum, the data erasure enabled drive as disclosed herein can be part of the internal data storage library system. As such, procedures can be developed to recycle or redeploy the tapes as a natural part of the data storage environment and as part of the life cycle management of tape cartridges.

While various embodiments of novel tape drive systems and methods of erasure for tape data cartridges have been disclosed, it will be recognized that other apparatus are included within the scope of the present disclosure. For example, the embodiments within the scope of this disclosure include a standalone data erase head, a read head with a data erase head (separate or combined as, for example, a hybrid head), a read/write head with a data erase head (separate or combined as, for example, a hybrid head), a tape cartridge having a read or read/write head with an erase head, a data library system or data management system having a read or read/write head with an erase head, etc. The figures provided herein are for illustrative purposes only and are not meant to be limiting of the various embodiments made possible by this disclosure. Accordingly, embodiments exist which can not only read and/or write data, as a traditional tape drive can, but can also erase data tracks using efficient data erase methods, as disclosed herein. Such tape drives may be used in a data library system or data management system. The present disclosure should therefore not be seen as limited to the particular embodiments described herein, but rather, it should be understood that the present disclosure has wide applicability to data erase systems in general. All modifications, variations, or equivalent arrangements that are within the scope of the attached claims should be considered to be within the scope of this disclosure.

We claim:

1. A tape drive system, comprising:
a data cartridge having a tape media, the tape media comprising N data bands separated by servo bands, wherein N is greater than 1;
a read/write/erase head assembly having a servo read element and, at most, N/2 erase element(s);
a tape transport mechanism, to transport the tape media from the data cartridge to the read/write/erase head assembly; and
servo and control elements configured for controlling the read/write/erase head assembly and providing an erase current through the erase element(s) as the tape media is passed by the read/write/erase head assembly to erase substantially all the data on the data bands while substantially preserving servo information in the servo bands, with, at most, N/2 data bands being substantially fully erased per pass of the tape media from one end of the tape media to the other, thus requiring at least two passes of the tape media to substantially fully erase all N data bands.

2. The tape drive system of claim 1, wherein the read/write/erase head assembly further comprises data read elements trailing the erase element(s) for verifying that erasure of data has occurred.

3. The tape drive system of claim 2, wherein the read/write/erase head assembly and servo and control elements are configured such that the data read elements verify erasure in the same pass of the tape media in which the erasure occurred.

4. The tape drive system of claim 1, further comprising a verify drive having data read elements for verifying that erasure of the data on the data bands has occurred after the process in which the erasure occurred has completed.

5. The tape drive system of claim 1, wherein the read/write/erase head assembly is configured to be used for both conventional reading and writing data to the data bands and for erasing substantially all the data on the data bands.

6. The tape drive system of claim 1, wherein the read/write/erase head assembly comprises an independent slider body for the erase element(s).

7. The tape drive system of claim 1, wherein the read/write/erase head assembly comprises a data read/write slider and the erase element(s) is/are appended thereto.

8. The tape drive system of claim 1, wherein the read/write/erase head assembly comprises at least one data read/write element, and the erase element(s) and at least one data read/write element are made in the same thin film wafer stack.

9. The tape drive system of claim 1, wherein active servo is used to precisely align an edge of the erase element(s) to an edge of a data band.

10. A tape library system comprising:
a library of data cartridges each having a tape media, the tape media comprising N data bands separated by servo bands, wherein N is greater than 1;
a tape drive system for receiving a data cartridge from the library, comprising:
a read/write/erase head assembly having a servo read element and, at most, N/2erase element(s);
a tape transport mechanism, to transport the tape media from the data cartridge to the read/write/erase head assembly; and
servo and control elements configured for controlling the read/write/erase head assembly and providing an erase current through the erase element(s) as the tape media is passed by the read/write/erase head assembly to erase substantially all the data on the data bands while substantially preserving servo information in the servo bands, with, at most, N/2 data bands being substantially fully erased per pass of the tape media from one end of the tape media to the other, thus requiring at least two passes of the tape media to substantially fully erase all N data bands.

11. A data erase head comprising:
one erase element having a substantially equal or slightly greater magnetic width than a magnetic width of a data band of a magnetic tape media having a plurality of data bands to be erased, such that the data erase head is configured to substantially fully erase only one data band of the tape media at a time in each traverse of the tape media from one end of the tape to the other end of the tape while substantially preserving servo information in servo bands of the tape media, adjacent to the data bands, such that the number of traverses of the tape media required to substantially fully erase all data bands of the tape media is at least as great as the number of data bands of the tape media.

12. The data erase head of claim 11, wherein the erase element comprises an erase gap array.

13. The data erase head of claim 12, wherein the erase gap array provides multiple erase exposures of the tape media in a single traverse of the tape media.

14. The data erase head of claim 11, wherein the erase element comprises termination patterns on its edges adjacent the servo bands.

15. A data erase head comprising:
at most, N/2 erase element(s) for erasing data bands of a magnetic tape media to be erased, the magnetic tape media comprising N data bands separated by servo bands, wherein N is greater than 1;
wherein each erase element has a substantially equal or slightly greater magnetic width than a magnetic width of a data band of the magnetic tape media; and
wherein the erase element(s) substantially fully erase data on the data bands of the magnetic tape media, as the magnetic tape media passes by the data erase head while substantially preserving servo information in the servo bands of the magnetic tape media, with, at most, N/2 data bands being substantially fully erased per pass of the magnetic tape media one end of the magnetic tape media to the other, thus requiring at least two passes of the magnetic tape media to substantially fully erase all N data bands.

16. The data erase head of claim 15, wherein the erase element(s) each comprise an erase gap array.

17. The data erase head of claim 16, wherein each erase gap array provides multiple erase exposures of the magnetic tape media in a single pass of the magnetic tape media.

18. The data erase head of claim 15, wherein the erase element(s) each comprise termination patterns on their edges adjacent the servo bands.

19. A data erase head comprising:
an erase element having a smaller magnetic width than a magnetic width of a data band of a magnetic tape media to be erased such that the erase element can be positioned along one edge of the data band and erase a portion of data tracks less than all of the data tracks of the data band in one pass of the tape media from one end the tape to the other end of the tape and can be positioned along the opposite edge of the data band and erase the remaining portion of the data tracks in a second pass of the tape media from one end the tape to the other end of the tape while substantially preserving servo information in servo bands of the tape media, adjacent to the data band.

20. A data erase head comprising:
two erase elements having a smaller magnetic width than a magnetic width of a data band of a magnetic tape media to be erased, one erase element having a precision write edge location to one boundary of a servo band and configured for erasure of a portion of a first data band and the other erase element having a precision write edge location to the opposite boundary of the servo band and configured for erasure of a portion of a second data band, such that the erase elements erase a portion of data tracks less than all of the data tracks of each of their respective data bands in one pass of the tape media from one end the tape to the other end of the tape while substantially preserving servo information in the servo band of the tape media.

21. A data erase head comprising an array of erase gap elements configured, together, to erase data tracks from a single data band of a magnetic tape media, the erase gap elements providing multiple erase exposures of a single data band of the magnetic tape media in a single pass of the magnetic tape media.

22. A read/write/erase head assembly comprising:
a first slider body having a plurality of read/write elements for reading and writing to data tracks of a data band of a magnetic tape media;
a second slider body having a plurality of read/write elements for reading and writing to data tracks of a data band of a magnetic tape media; and
an erase slider body for erasing data tracks of the data band, the erase slider body operably coupled with the first and second slider bodies.

23. The read/write/erase head assembly of claim 22, wherein the erase slider body is positioned in a space between the first and second slider bodies.

24. The read/write/erase head assembly of claim 22, further comprising a second erase slider body operably coupled with the first and second slider bodies.

25. The read/write/erase head assembly of claim 22, wherein the slider bodies are each made in the same thin film wafer stack.

26. A method of erasing data from a data band of magnetic tape media, comprising:
providing one erase element having a substantially equal or slightly greater magnetic width than a magnetic width of a data band of a magnetic tape media having a plurality of data bands to be erased; and substantially fully erasing only one data band of the tape media at a time with the erase element in each traverse of the tape media from one end of the tape to the other end of the tape while substantially preserving servo information in servo bands of the tape media, adjacent to the data bands, such that the number of traverses of the tape media required to substantially fully erase all data bands of the tape media is at least as great as the number of data bands of the tape media.

27. A method of erasing data from a data band of magnetic tape media, comprising:
providing at most, N/2 erase element(s) for erasing data bands of a magnetic tape media to be erased, the magnetic tape media comprising N data bands separated by servo bands, wherein N is greater than 1, wherein each erase element has a substantially equal or slightly greater magnetic width than a magnetic width of a data band of the magnetic tape media; and
substantially fully erasing data on the data bands of the tape media using the erase element(s), as the magnetic tape media passes by the data erase head while substantially preserving servo information in the servo bands of the magnetic tape media, with, at most, N/2 data bands being substantially fully erased per pass of the magnetic tape media from one end of the magnetic tape media to the other, thus requiring at least two passes of the magnetic tape media to substantially fully erase all N data bands.

28. A method of erasing data from a data band of magnetic tape media, comprising:
providing an erase element having a smaller magnetic width than a magnetic width of a data band of a magnetic tape media to be erased;
positioning the erase element along one edge of the data band and erasing a portion of data tracks less than all of the data tracks of the data band in one pass of the tape media from one end the tape to the other end of the tape;
positioning the erase element along the opposite edge of the data band and erasing the remaining portion of the data tracks in a second pass of the tape media from one end the tape to the other end of the tape; and
substantially preserving servo information in servo bands of the tape media, adjacent to the data band.

29. A method of erasing data from a data band of magnetic tape media, comprising:
providing two erase elements having a smaller magnetic width than a magnetic width of a data band of a magnetic tape media to be erased, one erase element having a precision write edge location to one boundary of a servo band and configured for erasure of a portion of a first data band and the other erase element having a precision write edge location to the opposite boundary of the servo band and configured for erasure of a portion of a second data band;
erasing a portion of data tracks less than all of the data tracks of each of the first and second data bands using the two erase elements in one pass of the tape media from one end the tape to the other end of the tape while substantially preserving servo information in the servo band of the tape media.

30. A method of erasing data from a data band of magnetic tape media, comprising:
providing an array of erase gap elements configured, together, to erase data tracks from a single data band of a magnetic tape media; and
providing multiple erase exposures of a single data band of the magnetic tape media in a single pass of the magnetic tape media using the array of erase gap elements.

* * * * *